(12) United States Patent
Yushin et al.

(10) Patent No.: US 11,316,148 B2
(45) Date of Patent: Apr. 26, 2022

(54) NANOCOMPOSITE OF A NANOPOROUS MATERIAL AND AN ACTIVE MATERIAL AND METHOD OF SYNTHESIZING THEREOF

(71) Applicant: Sila Nanotechnologies, Inc., Alameda, CA (US)

(72) Inventors: Gleb Yushin, Atlanta, GA (US); Danni Lei, Atlanta, GA (US)

(73) Assignees: SILA NANOTECHNOLOGIES, INC., Alameda, CA (US); GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 16/103,663

(22) Filed: Aug. 14, 2018

(65) Prior Publication Data
US 2019/0051892 A1  Feb. 14, 2019

Related U.S. Application Data

(60) Provisional application No. 62/545,277, filed on Aug. 14, 2017.

(51) Int. Cl.
*H01M 4/36* (2006.01)
*H01M 4/38* (2006.01)
(Continued)

(52) U.S. Cl.
CPC .............. *H01M 4/364* (2013.01); *B82Y 30/00* (2013.01); *B82Y 40/00* (2013.01); *H01G 11/24* (2013.01);
(Continued)

(58) Field of Classification Search
CPC ...... H01M 4/521; H01M 4/624; H01M 4/583; H01M 4/38; H01M 4/364; H01M 4/0471;
(Continued)

(56) References Cited

U.S. PATENT DOCUMENTS

| 2010/0092865 A1* | 4/2010 | Kanno | C04B 41/009 429/221 |
| 2013/0220817 A1* | 8/2013 | Walker | H01M 4/58 205/59 |

(Continued)

FOREIGN PATENT DOCUMENTS

KR    20120063167 A  *  6/2012  ........... B82B 3/0004

OTHER PUBLICATIONS

Meng "Gas-liquid interfacial assembly and electrochemical properties of 3D highly dispersed a-Fe2O3@graphene aerogel composites with a hierarchical structure for applications in anodes of lithium ion batteries." Electrochimica Acta 224, 40-48, online Dec. 2016 (Year: 2016).*

(Continued)

*Primary Examiner* — Tri V Nguyen
(74) *Attorney, Agent, or Firm* — Muncy, Geissler, Olds & Lowe, P.C.; Daniel Podhajny

(57) ABSTRACT

In an embodiment, an active material-based nanocomposite is synthesized by infiltrating an active material precursor into pores of a nanoporous carbon, metal or metal oxide material, and then annealing to decompose the active material precursor into a first gaseous material and an active material and/or another active material precursor infiltrated inside the pores. The nanocomposite is then exposed to a gaseous material or a liquid material to at least partially convert the active material and/or the second active material precursor into active material particles that are infiltrated inside the pores and/or to infiltrate a secondary material into the pores. The nanocomposite is again annealed to remove volatile residues, to enhance electrical contact within the active material-based nanocomposite composite and/or to enhance one or more structural properties of the nanocomposite. In a further embodiment, the pores may be further (Continued)

infiltrated with a filler material and/or may be at least partially sealed.

31 Claims, 17 Drawing Sheets

(51) Int. Cl.

| | |
|---|---|
| *H01M 4/52* | (2010.01) |
| *H01M 4/583* | (2010.01) |
| *H01M 4/62* | (2006.01) |
| *H01G 11/32* | (2013.01) |
| *H01G 11/24* | (2013.01) |
| *H01G 11/46* | (2013.01) |
| *H01G 11/86* | (2013.01) |
| *B82Y 40/00* | (2011.01) |
| *H01G 11/36* | (2013.01) |
| *H01M 4/04* | (2006.01) |
| *B82Y 30/00* | (2011.01) |
| *H01G 11/58* | (2013.01) |

(52) U.S. Cl.
CPC ............ *H01G 11/32* (2013.01); *H01G 11/36* (2013.01); *H01G 11/46* (2013.01); *H01G 11/86* (2013.01); *H01M 4/0471* (2013.01); *H01M 4/38* (2013.01); *H01M 4/521* (2013.01); *H01M 4/583* (2013.01); *H01M 4/623* (2013.01); *H01M 4/624* (2013.01); *H01G 11/58* (2013.01)

(58) Field of Classification Search
CPC ....... H01M 4/623; H01G 11/36; H01G 11/24; H01G 11/32; H01G 11/46; H01G 11/58; H01G 11/86; B82Y 30/00; B82Y 40/00
USPC .......................... 252/500, 502, 506, 510, 511
See application file for complete search history.

(56) References Cited

U.S. PATENT DOCUMENTS

| | | | |
|---|---|---|---|
| 2014/0225041 A1* | 8/2014 | Archer | C01B 32/00 252/503 |
| 2014/0232031 A1* | 8/2014 | Neumann | H01M 4/5825 264/29.1 |
| 2015/0004499 A1* | 1/2015 | Kitagawa | H01B 1/122 429/306 |
| 2016/0043384 A1* | 2/2016 | Zhamu | H01M 4/133 429/231.4 |
| 2017/0103856 A1* | 4/2017 | Zhamu | H01G 11/02 |

OTHER PUBLICATIONS

Park "Multiphase and Double-Layer NiFe2O4@NiO-Hollow-Nanosphere-Decorated Reduced Graphene Oxide Composite Powders Prepared by Spray Pyrolysis Applying Nanoscale Kirkendall Diffusion." ACS Appl. Mater. Interfaces 2015, 7, 16842-16849 (Year: 2015).*

* cited by examiner

NANOCOMPOSITE OF A NANOPOROUS MATERIAL AND AN ACTIVE MATERIAL AND METHOD OF SYNTHESIZING THEREOF

CLAIM OF PRIORITY UNDER 35 U.S.C. § 119

The present application for patent claims the benefit of U.S. Provisional Application No. 62/545,277, entitled "Metal-Based Nanoparticles Confined in Carbon Nanopores for Energy Storage and Other Applications," filed Aug. 14, 2017, which is expressly incorporated herein by reference in its entirety.

BACKGROUND

Field

The present disclosure relates generally to nanomaterials, and more particularly to nanocomposite of a nanoporous material and an active material and method of synthesizing thereof.

Background

Rapidly increasing demands for renewable energy harvesting (such as solar, wind, etc.) and the growing market for electric vehicles has led to increasing demand for high-performance rechargeable batteries that have high energy power densities, and which are both cost-effective and environmentally friendly. Some commercial Li-ion batteries (LIBs) utilize organic electrolytes, which exhibit high flammability. In addition, such batteries require expensive and relatively rare lithium (Li) and are mostly based on cobalt (Co)-containing cathodes. It has been shown that Co-containing LIBs that additionally utilize solvent-based electrode processing and are based on organic electrolytes may have multiple and significant negative environmental impacts. The production, processing, and use of cobalt may cause adverse respiratory, pulmonary, and neurological effects in those exposed. The insufficient use of suitable personal protection equipment in many developing countries along with recent findings of exploitations of children in Co mines and related child sickness and deaths also make safer, cheaper and more abundant battery chemistries more attractive. Iron (Fe)-based electrodes (including conventional aqueous alkaline Ni—Fe batteries), for example, have attracted renewed interest due to the low cost, high abundance, and eco-friendliness of Fe, as well as the compatibility of such electrode chemistry with nonflammable, low-cost, aqueous alkaline electrolytes which exhibit high conductivity and thus do not require very thin (and thus more expensive to produce) electrodes.

Unfortunately, commercial Fe electrodes based on multi-micron-scale Fe particles may only utilize 10-20% of the Fe theoretical capacity and additionally suffer from slow rates and low initial capacity, which gradually grows during the initial 20-50 "formation" cycles, thus limiting initial energy density of the cells. In addition, hydrogen evolution (HE) on the Fe anode consumes electrolyte and competes with the charging reaction, further reducing accessible capacity and limiting cycle life. Further, it has been found that Fe dissolution and surface passivation (formation of an insulative layer on the Fe surface) may significantly limit large-scale applications of Fe anodes.

To address the limitations of slow-building initial capacity and limited rate performance of Fe anodes, one conventional approach is to mix Fe or $FeO_x$ nanoparticles with conductive carbon or to make a (nano)composite of the Fe or $FeO_x$ nanoparticles and carbon (such as graphene, carbon-black, carbon nanofibers), which improves electrical conductivity of the electrodes. Such procedures typically involve high-energy ball milling or high temperature and high pressure hydrothermal methods. These methods offer limited control of the (nano)composite microstructure and suffer from a lack of composite uniformity. In addition, the high surface area of the produced electrodes (and thus higher surface available for undesired HER side reactions) and the observed Fe dissolution and re-precipitation to form larger agglomerates (particularly upon Fe use in a broader potential range) may limit the success of these approaches.

Other batteries electrodes based on abundant and low cost metals, such as Fe, Zn, Mn, Mg, Al, Ca, Cu, Cd, Pb as well as their hydroxides, oxides, oxyhydroxides, sulfides, halides, oxyhalides, sulfur halides and their other salts and salt mixtures also typically suffer from irreversible structural changes and dissolution during electrochemical reactions during battery cycling, particularly at elevated temperatures.

Accordingly, there remains a need for improved carbon, metal or metal oxide or metal hydroxide or metal oxyhydroxide composites and the like for various applications, components, and other related materials and manufacturing processes.

SUMMARY

Embodiments disclosed herein address the above stated needs by providing improved batteries, components, and other related materials and manufacturing processes.

In an example, an active material-based nanocomposite for using in an electrolyte-containing electrochemical energy storage device includes a nanoporous carbon, metal, or metal oxide material, active material particles infiltrated in pores of the nanoporous carbon, metal or metal oxide material, and a filler material infiltrated in the pores separately from the active material particles and/or a sealing material that at least partially closes the pores, wherein the active material particles comprise Fe, and wherein the active material particles comprise from about 30 vol. % to about 96 vol. % of a total volume of the active material-based nanocomposite.

In a further example, a method of synthesizing an active material-based nanocomposite for an electrochemical energy storage device includes infiltrating a first active material precursor into pores of a nanoporous carbon, metal or metal oxide material to produce the active material-based nanocomposite, annealing the active material-based nanocomposite at a first temperature to at least partially remove excess material of the first active material precursor from an external surface of the active material-based nanocomposite, annealing the active material-based nanocomposite at a second temperature to at least partially decompose the first active material precursor into a first gaseous material and an active material and/or a second active material precursor infiltrated inside the pores, exposing the active material-based nanocomposite to a second gaseous material or a liquid material to at least partially convert the active material and/or the second active material precursor into active material particles that are infiltrated inside the pores and/or to infiltrate a secondary material into the pores, and annealing the active material-based nanocomposite at a third temperature to remove volatile residues, to enhance electrical contact within the active material-based nanocomposite composite and/or to enhance one or more structural properties of the active material-based nanocomposite.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1A:
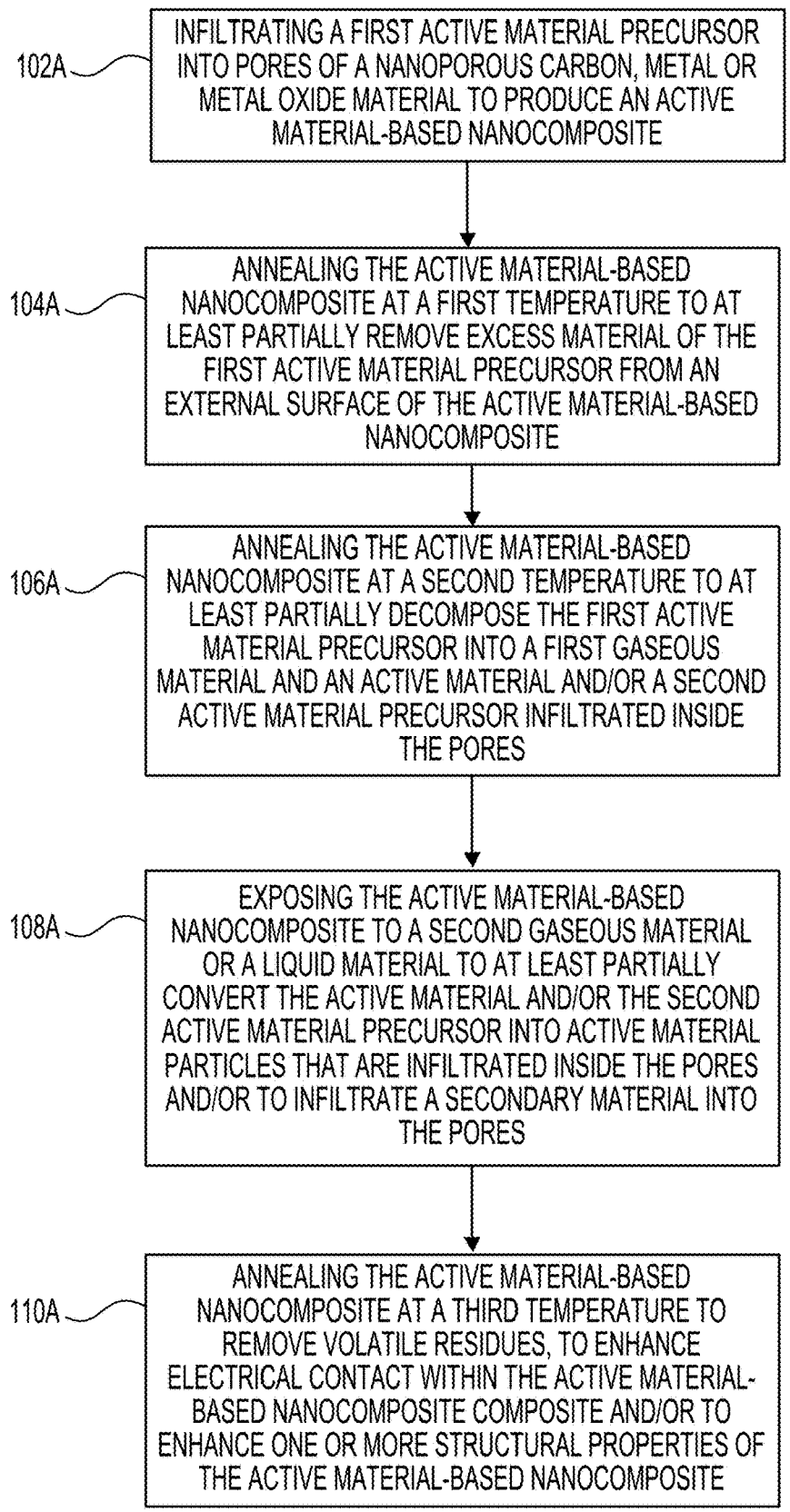
FIG. 1A illustrates a process of synthesizing an active material-based nanocomposite in accordance with an embodiment of the disclosure.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of alkaline batteries (for brevity and convenience), it will be appreciated that various aspects may be applicable to other aqueous rechargeable and primary batteries or other electrochemical energy storage devices operating with near-neutral and acidic aqueous electrolytes as well as polymer gel electrolytes of various pH, aqueous ionic liquids, organic electrolytes, dry polymer electrolytes and also electrolytes that comprise more than one solvent.

Illustrative examples of such electrolytes that comprise more than one solvent may include electrolyte that comprise a mixture of water and an organic solvent or a mixture of water and an aqueous ionic liquid or a mixture of several organic solvents or a mixture of water and an ionic liquid or a mixture of water and two or more organic solvents and an ionic liquid, etc. Electrolytes may comprise one or more inorganic or organic salts, in some designs. Electrolytes may comprise one or more surfactants.

While the description below may describe certain examples in the context of batteries (for brevity and convenience), it will be appreciated that various aspects may be applicable to other electrochemical energy storage devices, such as electrochemical capacitors (often referred to as pseudocapacitors or supercapacitors), hybrid energy storage devices (e.g., with one electrode being battery-like and another electrode being electrochemical capacitor-like) as well as to electrochemical sensors and catalysts.

While the description below may describe certain examples in the context of near spherical-shaped composite particles, it will be appreciated that other shapes of particles (such as platelet-shaped particles, elongated particles, fiber-shaped particles, randomly shaped particles and others with a variable surface roughness and surface curvature) may similarly be effectively utilized in some designs.

While the description below may describe certain examples in the context of composites comprising activated carbons, it will be appreciated that other types of porous carbon materials may similarly be effectively utilized in some designs.

While the description below may describe certain examples in the context of composites comprising porous carbons, it will be appreciated that other porous matrix materials (including electrically or ionically conductive materials) may similarly be utilized in some designs.

While the description below may describe certain examples in the context of composite materials comprising a single metal, it will be appreciated that various aspects may be applicable to composite materials comprising two or three or more metals in the form of metal alloys, metal mixtures, oxides, hydroxides, oxyhydroxides, sulfides, halides, oxyhalides, sulfur halides and other salts and salt mixtures or mixtures of metal and metal salts (incl. oxides, hydroxides, oxyhydroxides, sulfides, halides, oxyhalides, sulfur halides, etc.).

Aqueous batteries benefit from the higher ionic conductivity, low cost, and nonflammability of aqueous electrolytes. While the description below discusses (by way of example) alkaline aqueous batteries, it will be appreciated that other types of aqueous batteries (e.g., aqueous metal-ion batteries) may similarly benefit from various aspects of this disclosure.

While the description below discusses (by way of example) composite structures, synthesis methods, and applications of various iron (Fe) oxide nanostructures and nanomaterials, it will be appreciated that similar composite structures, synthesis methods, and applications may be applied to nanostructures based on iron metal (Fe) and other metals (examples of which may include but not limited to Zn, Ni, Mn, Ag, Al, Cu, Si, Sn, Sb, Ti, Nb, Ta, Li, Na, Mg, Ca, Cu, Cd, Pb, Cr, Bi, Tl, Ni, Co, La, Zr, Au, Pt, Ag and their various mixtures, among others), as well as their oxides, hydroxides, oxy-hydroxides, sulfides, selenides, halides (e.g., metal fluorides, metal iodides, metal bromides, etc.), oxy-halides, sulfur halides, hydrides, phosphides, nitrides, nitrates, and/or other metal salts as well as various mixtures (or alloys) of the described above metals, metal oxides, metal oxy-hydroxides, metal sulfides, metal sulfates, metal phosphates, metal phosphides, metal nitrides, metal nitrates, metal selenides, metal halides, metal hydrides, other metal salts and/or their variations and various combinations (e.g., mixture of metal salts and metal particles, such as a mixture of LiF and Cu or LiF and Cu and Fe, etc.).

As will be described in more detail below, at least one embodiment of the present invention is directed to iron (Fe) or iron oxide ($FeO_x$)/nanoporous carbon (C) nanocomposites and synthesis thereof, which may be useful, for example, as an anode material in aqueous alkaline batteries (e.g., where the electrolyte has a pH greater than 7, with the OH-ions participating in electrochemical reactions). In an example, the crystalline $FeO_x$ nanoparticles in such composites may be advantageously very uniformly distributed within individual nanoporous C particles. In one or more embodiments, the conductivity enhancement and small size of $FeO_x$ particles (e.g., less than about 5 nm in one example, but generally determined by the size of the pores in nanoporous carbon and may advantageously range from about 0.5 nm to about 500 nm for certain applications) effectively enhance the discharge capacity of Fe anodes (e.g., up to 600 mAh $g^{-1}$ in one example of a particular alkaline cell). In contrast to graphene-$FeO_x$ or carbon nanotube-$FeO_x$, the relatively large spherical shape of the produced nanocomposites in accordance with one or more embodiments allows them to be processed into electrodes in the same way as battery or electric double layer capacitor electrodes are produced in industry. Furthermore, the nanoconfinement suppresses side reactions, such as nanoFe dissolution and hydrogen evolution reaction in the case of aqueous batteries, on very high surface area electrodes. In applications where enhanced long-term anode stability is desired, increase of the discharge cut-off voltage and the use of both electrode and electrolyte additives can reduce the Fe dissolution and improve capacity retention.

The use of indium (In)-based additives (or, more generally, In-based organic or inorganic pore fillers in porous nanocomposites) may be particularly attractive in certain aqueous battery electrodes, e.g., increasing capacity utilization and changing the discharge profile of the $FeO_x$/nanoporous carbon anode from a two-plateau to a single plateau shape, which improves energy density of cells with Fe-based anodes. Other organic or inorganic fillers based on other metals may also provide advantages/improvements in cell performance. If such fillers are used for anodes in batteries with aqueous electrolytes, for example, they may advantageously comprise In, S, Na, Cd, Pb, Ga, O, Cl, F, Nb, Ti, Ta, Mo, W, Zn, Sn, Bi, H, C, N, P, Si, Sn, Sb, Cu and other elements (e.g., as various polymers such as an $OH^-$ conducting polymer, various cross-linked (polymerized) ionic liquids, various organic salts, such as salts of carboxylic acids, salts of sulfonic acids and various other organometallic (or metalorganic) reagents (e.g., various organoindium, organotin, organocadmium, organolead, organogallium, organoniobium, organotitanium, organotantalum, organomolybdenum, organotungsten, organotin, organoantimony and other organometallic or metalorganic reagents) or inorganic salts, such as oxides, hydroxides, oxyhydroxides, sulfates, nitrates, nitrides, imides, sulfides, halides (such as fluorides, bromides, chlorides, etc.), oxyhalides, among others or carbon, among others).

If pores in (nano)porous (e.g., nanocomposite) particles (e.g., anode or cathode particles) are sealed (rather than filled, so that some of the pores remain closed and not accessible by some liquids (e.g., electrolyte solution) or gases (e.g., $N_2$) from the outside of the composite porous particles), the sealing material (e.g., a polymer, a gel, a ceramic, carbon, or a composite or another material) may preferably exhibit medium-to-high ionic conductivity at operating conditions (e.g., from about $10^{-12}$ to about 1 S $cm^{-1}$) for active ions (e.g., $OH^-$, $H^3O^+$, $Na^+$, $K^+$, $Ca^{2+}$ or $Li^+$, etc., depending on the cell and electrolyte chemistry) to enable electrochemical cell operation at a reasonable (for a desired application) rate. If the pores are mostly filled (e.g., by approximately 50% or more of the available open pore volume), the filler material may also preferentially exhibit medium-to-high ionic conductivity (e.g., from about $10^{-12}$ to about 1 S $cm^{-1}$) for active ions (e.g., $OH^-$, $H^3O^+$, $Na^+$, $K^+$, $Ca^{2+}$ or $Li^+$, etc., depending on the cell chemistry) to enable electrochemical cell operation at a reasonable (for a desired application) rate. In some designs, it may be preferable for the sealing material(s) or filler material(s) to exhibit limited (if any) solubility in the electrolytes (e.g., not dissolve by over about 50 vol. % in an assembled electrochemical cell during its lifetime operation—e.g., during cycling). The actual solubility may vary depending on the cell operating temperature, amount and composition of electrolyte, and potential range of electrode exposure, among other factors.

In some applications (e.g., when hydrogen evolution on an anode in aqueous electrolytes should preferably be suppressed or when oxygen evolution on a cathode in aqueous electrolytes should preferably be suppressed), the filler material(s) or sealing material(s) (e.g., polymer-based) may preferably exhibit very selective permeability. That is, to be substantially permeable to active ions (e.g., $OH^-$ or $Na^+$, etc.), while being substantially impermeable to water in for such batteries (or, more generally, electrochemical energy storage devices) with aqueous electrolytes. In certain applications, it may be preferable for the permeability ratio of active ions to water molecules to exceed 10 (or preferably to exceed 100, or more preferably to exceed 1,000). In some designs, it may be preferable for these materials to be selective for permeability of different ions (e.g., be selectively permeable to an active material such as $Li^+$ or $Na^+$, but not to "inactive" $H^+$ or $H_3O^+$ in the case of aqueous $Li^+$ or $Na^+$ battery anodes). In certain applications, it may also be important for certain polymer-based fillers or sealing materials to exhibit chemical and electrochemical stability in electrolyte solutions. For example, if an alkaline electrolyte is used, it may be advantageous for the fillers or sealing materials to be stable in alkaline media so that the conductivity or selective permeability of these materials does not deteriorate substantially during storage or battery cycling. In certain applications, it may also be important for these materials to create a large barrier for electron transport (that is, to be highly resistive for transport of electrons, as insulators; the electron transport related conductivity may preferably be lower than the ionic transport-related conductivity by 100 times or, more preferably, by 1,000 times or, still more preferably, by 10,000 times).

In some examples, the majority transport of the $OH^-$ in sealant or filler materials for cells with alkaline aqueous electrolytes may proceed by the so-called Grotthuss mechanism or its modifications. According to such a mechanism, hydroxide diffuses through a hydrogen-bonded network within an ionically conductive hydroxide-containing polymer material through the formation and cleavage of covalent bonds. In other examples, transport of the $OH^-$ in sealant or filler materials for cells with alkaline aqueous electrolytes may proceed via different mechanisms.

Suitable examples of polymer-based fillers or sealing materials that provide sufficient conductivity for $OH^-$ ions in alkaline aqueous electrolytes include, but are not limited to, various anion conducting heterogeneous polymers (such as alkoxysilane/acrylate or epoxy alkoxysilane, various co-polymers comprising MPS, VBC, poly(phenylene oxide) (PPO), $Si(OCH_3)_3$, etc.), various anion conducting interpenetrating polymer networks (such as those comprising PCMS, polyvinyl alcohol (PVA), polyvinyl acetate (PVA), PVBC, dicyclopentadiene (DCPD), 1,4-diazabicyclo[2.2.2]octane (DABCO), divinylbenzene (DVB), poly(vinyl butyral) (PVB), poly(ethylene oxie) (PEO)/PEG, poly(phenylene) (PP), PPO, poly(ethylene) (PE), poly(benzimidazole) (PBI), poly(arylene sulfide) (PAS), polyethylenimine (PEI), dibasic ester (DBE), PS, poly(styrene ethylene butylene polystyrene) (PSEBS), TEA, poly(vinylidene fluoride) (PVDF), ethylene tetrafluoroethylene (ETFE), fluorinated ethylene propylene (FEP), various other fluoropolymer-based compounds such as poly($\alpha,\beta,\beta$-trifluorostyrene) (PTFS) and others, poly(sulfone) (PSU), poly(ether sulfones) (PES), poly(p-phenylene oxide) (PPO), poly(diallyldimethylammonium chloride) (PDADMAC), polysulfone polyphenylene sulfide sulfone (PSfPPSS), poly (phthalazinone ether sulfone ketone) (PPSEK), polyethersulfone (PSF), poly (phenylene sulfide) (PPS), various poly (ionic liquids) (cross-linked ionic liquids), PAAm, poly(acrylonitrile), various polyquaterniums, etc.), various anion conducting homogeneous polymers and co-polymers (such as those comprising PCMS, PVA, PAS, PVBC, DCPD, DABCO, DVB, PVB, poly(ethylene oxie) (PEO)/PEG, poly(phenylene) (PP), poly (phenylene oxide) (PPO), poly(ethylene) (PE), poly(benzimidazole) (PBI), poly(arylene sulfide) (PAS), PEI, PEO/ PEG, DBE, PS, LDPE, PSEBS, TEA, PVDF, ETFE, FEP, PTFS, PSU, PES, PPO, DVB, PDADMAC, PSfPPSS, PPSEK, PSF, PPS, various quaternary ammonium salts (e.g., benzyltrialkylammonium tetraalkylammonium, trimethyl ammonium, dimethyl ammonium, diallyldimethylammonium, etc.), various ammonium groups, norbornene, cycloalkenes (e.g., cyclooctene, etc.), methacrylates, butyl acrylate, vinyl benzyl, poly(phenylene), organochlorine compounds (e.g., epichlorohydrin, etc.), ethers, bicyclic amines (e.g., quinuclidine), various poly (ionic liquids) (cross-linked ionic liquids), various other amines (e.g., diamines such as ethylene diamine, monoamines, etc.), various poly(ether imides), various polysaccharides (e.g., chitosan, etc.), xylylene, guanidine, pyrodinium, among other units. The anion conducting homogeneous polymers may be prepared by using polymerization or polycondensation, by using radiation-induced grafting, by chemical grafting, among other methods. Interestingly and somewhat surprisingly, in some designs the described above examples of polymer-based fillers or sealing materials may also be suitable for use in some of the organic electrolytes (e.g., to protect active materials (such as Si, Sn, Sb, metal fluorides including $FeF_3$, $FeF_2$, $CuF_2$, LiF, others), Fe, Cu, etc. or to protect electrolyte against undesirable side reactions on the active material surface) in metal-ion, such as Li-ion or Na-ion or other, batteries).

In some designs, it may be preferable for the polymer-based fillers or sealing materials to exhibit conductivity for active ions in the range from about $10^{-9}$ S $cm^{-1}$ to about $10^{-2}$ S $cm^{-1}$ at room temperature (in some designs—from about $10^{-7}$ S $cm^{-1}$ to about $10^{-3}$ S $cm^{-1}$ at operating temperatures). Lower than $10^{-9}$ S conductivity may undesirably reduce electrochemical reaction rates to the level too low for many practical applications.

In some designs, it may be preferable for such materials to exhibit small swelling in aqueous electrolyte solutions (e.g., lower than about 40 vol. %, more preferably less than about 10 vol. %, or still more preferably less about 2 vol. %).

Swelling in pure water may be sufficiently different than in aqueous electrolytes (such as alkaline electrolytes).

In some designs (e.g., when not pure aqueous electrolytes are used), it may be preferable for such materials to exhibit small swelling in the electrolyte solutions used in electrochemical energy storage devices (e.g., lower than about 40 vol. %, more preferably less than about 10 vol. %, or still more preferably less about 2 vol. %).

Suitable examples of polymer-based fillers or sealing materials that provide sufficient conductivity for $Li^+$ or $Na^+$ or $K^+$ ions in aqueous electrolytes include, but are not limited to, various cation conducting heterogeneous polymers, various cation conducting interpenetrating polymer networks and various cation conducting homogeneous polymers/co-polymers, such as those comprising oxygen-containing polymers or units (e.g., polyethylene oxide, poly (epichlorohydrin), poly(ethylene succinate), poly(8-propiolactone), and poly(ethylene adipate), etc.), poly (ethylene-imine) and its derivatives, various polyphosphazenes, various polyethers, poly(acrylonitrile), poly(acrylamide), divinylbenzene, poly(methyl methacrylate), poly(vinyl chloride), poly(vinylidene fluoride) (PVdF), polyvinylidene fluoride-cohexafluoropropylene, various (poly)imides, various complexes of these and other co-polymers/polymers with alkali-metal salts, among others. In some designs, it may be preferable for such materials to exhibit small swelling in aqueous electrolyte solutions (e.g., lower than about 40 vol. %, more preferably less than about 10 vol. %, or still more preferably less about 3 vol. %). Swelling in pure water may be sufficiently different than in aqueous electrolytes (such as aqueous $Li^+$ or $Na^+$ or $K^+$ or $Ca^{2+}$ electrolytes or other types of aqueous electrolytes).

Interestingly, in some designs the described above examples of polymer-based fillers or sealing materials for use in aqueous (e.g., $Li^+$ or $Na^+$ or $K^+$ ion) electrolytes may also be suitable for use in some of the organic (e.g., $Li^+$ or $Na^+$ or $K^+$ ion) electrolytes to e.g., protect active materials (such as Si, Sn, Sb, metal fluorides including $FeF_3$, $FeF_2$, $CuF_2$, LiF, others), Fe, Cu, etc.) or electrolyte against undesirable side reactions on the active material surface during operation of the electrochemical energy storage devices (e.g., a Li-ion battery or a supercapacitor).

The disclosed composites and techniques in accordance with one or more embodiments of the present invention provide safer and lower cost aqueous batteries from low-cost earth abundant materials, such as Fe, Zn, Mn, and Ti, among others. They may also provide improved operation of other types of batteries with liquid or solid electrolytes.

FIG. 1A illustrates a process of synthesizing an active material-based nanocomposite for an electrochemical energy storage device in accordance with an embodiment of the disclosure. At 102A, a first active material precursor (e.g., an $Fe(CO)_5$ precursor solution in the example of FIG. 1B) is infiltrated (e.g., via gas-phase impregnation or vacuum infiltration or impregnation or chemical vapor deposition (CVD) or atomic layer deposition (ALD) or other means) into pores of a nanoporous carbon, metal or metal oxide material to produce the active material-based nanocomposite. At 104A, the active material-based nanocomposite is annealed at a first temperature (e.g., about 60° C.) to at least partially remove (e.g., via evaporation) excess material of the first active material precursor (e.g., excess active material solution such as solvent, etc.) from an external surface of the active material-based nanocomposite (e.g., a surface of the active material-based nanocomposite outside of the pores). At 106A, the active material-based nanocomposite is annealed at a second temperature (e.g., about 140° C.) to at least partially decompose the first active material precursor into a first gaseous material (e.g., CO) and an active material (e.g., Fe) and/or a second active material precursor (e.g., iron oxide such as $FeO_x$) infiltrated inside the pores. As discussed above, the active material need not contain Fe, and could comprise any of Fe, Zn, Ni, Mn, Ag, Al, Cu, Si, Ti, Nb, Ta, Co, Si, Sn, Sb, Pb, Li, Cd, Cr, Bi, Tl, Ni, Co, Na, Mg or a mixture thereof, an oxide, hydroxide, oxy-hydroxide, sulfide, selenide, halide (e.g., fluoride, chloride, iodide) and halide mixtures, oxy-halide, nitride, phosphide or hydride of any thereof, a mixture or alloy of two or more distinct materials from the classes of metals, semi-metals, metal oxides, metal oxy-hydroxides, metal sulfides, metal sulfates, metal phosphates, metal phosphides, metal nitrides, metal nitrates, metal selenides, metal fluorides, metal oxyfluorides, metal hydrides, and/or other metal salts, or any combination thereof, and so on.

At 108A, the active material-based nanocomposite is exposed to a second gaseous material (e.g., air, nitrogen, argon, one or more hydrogen or hydrogen-containing gases, one or more sulfur-containing gases, at least one fluorine-containing gas, a combination thereof, etc.) or a liquid material (e.g., a sulfur-containing liquid) to at least partially convert the active material and/or the second active material precursor into active material particles (e.g., amorphous active material particles, including but not limited to oxide nanoparticles, metal hydride nanoparticles, metal sulfide nanoparticles, metal salts, mixed compositions such as metal-metal salt and/or metal-metal oxide compositions, etc.) that are infiltrated inside the pores and/or to infiltrate a secondary material into the pores. In an example, the secondary material may be produced as a reaction with the second gaseous material or liquid material (e.g., between the second gaseous material or liquid material the active material and/or the second active material precursor and/or a filler material). Various examples of the secondary material that can be formed at 108A will be provided below with respect to FIG. 1B.

At 110A, the active material-based nanocomposite is annealed at a third temperature (e.g., about 300° C.) to remove volatile residues, to enhance electrical contact within the active material-based nanocomposite (e.g., between the active material particles and the nanoporous carbon, metal or metal oxide material), and/or to enhance one or more structural properties of the active material-based nanocomposite. In a further example, the annealing at the third temperature may also function to at least partially crystalize the active material particles inside the pores. It may be advantageous for the infiltrated/deposited active material in the composite to occupy between about 20% and about 99.99% of the total volume of the pores (in some designs—between about 50% and about 96%). Occupying smaller than 20% of the volume may negatively impact volumetric energy storage characteristics and additionally lead to reduced cycle stability for certain applications. Occupying more than 99.99% of the total volume of the pores may undesirably increase complexity and cost of the infiltration/deposition of the active material and additionally lead to reduced (charge or discharge) rate performance or (in some cases) reduced cycle stability of the electrochemical cells for certain application. It may further be advantageous for the infiltrated/deposited active material in the composite to occupy between about 30% and about 99% of the total volume of the composite (in some designs—between about 40% and about 95%). Smaller than 30 vol. % fraction may undesirably reduce its volumetric capacity, while larger than 99 vol. % fraction may reduce its stability and performance characteristics.

In some designs, some portion of the active material (e.g, from around 1 wt. % to around 100 wt. %) may be at least partially oxidized thereby forming an oxide (for example, $FeO_x$—such as $FeO_{4/3}$ or other forms of an oxide) or an oxide layer.

Referring to FIG. 1A, in an example, 102A, 104A and 106A may be repeated a number of times (e.g., three times, four times, etc.) to increase a degree to which the pores are filled with the active material by vol. %. In a further example, at some point before 102A, the pores of the nanoporous metal or metal oxide material may first be pre-infiltrated with a filler material (or additive). In an example, as noted above, the filler material may comprise Indium (e.g., $In(acac)_3$) or sulfur (e.g., $Na_2S$), although other materials may also be used.

In addition to using (repeated) infiltration and (in some designs) reduction processes, various (e.g., described above) active materials may be introduced into the carbon (or other suitable porous matrix material) pores by means of infiltration, electrodeposition, electroless deposition, CVD, ALD and their combinations as well as other known methodologies of depositing thin films or nanoparticles. In addition, such active materials may be introduced as salts dissolved into the polymers or polymer mixtures, which may be carbonized to produce carbon-metal oxide or carbon-metal or other similar (nano)composites comprising metal or metal-based (nano)particles.

In another example, at some point after 110A, the pores of the active material-based nanocomposite may be sealed with a sealing material. Alternatively, the pores of the active material-based nanocomposite may remain unsealed. In an example, the filler material and/or the sealing material may exhibit high ionic conductivity while being substantially insoluble in (e.g., aqueous) electrolyte. In another example, the filler material and/or the sealing material may be substantially impermeable to an electrolyte solvent (e.g., water in case of an aqueous electrolyte or an organic solvent in case of an organic electrolyte). In another example, the filler material and/or the sealing material may be configured as insulators which a relatively high amount of resistance to electron transport. In another example, the filler material and/or the sealing material may be resistant to swelling in the aqueous electrolyte (e.g., less than about 40% swelling in (e.g., aqueous) electrolyte, and preferably less than about 10% swelling in aqueous electrolyte).

As discussed briefly in the background above, commercial Fe electrodes are conventionally based on multi-micron-scale Fe particles, which suffer from slow-building initial capacity and limited rate performance. By contrast, the crystalline Fe or $FeO_x$ nanoparticles disclosed herein may be very uniformly distributed within nanoporous C particles (e.g., spheres). This Fe anode architecture offers several unique advantages for certain applications, including but not limited to: (i) porous carbon can control the size of $FeO_x$ nanocrystals, (ii) carbon pore walls enable rapid electron transport to electrochemical reaction sites within $FeO_x$, (iii) confinement of $FeO_x$ nanoparticles prevents their agglomeration within the composite during cycling, and (iv) the small size of the C pores reduces $FeO_x$ dissolution and hydrogen evolution reaction (HER). Also disclosed is application of indium (In)-based organic additive(s), which may be infiltrated into the porous electrode particles prior to cycling. The infiltrated In may slow down HER (In overpotential for HER is higher than that for Fe) and prevent or reduce undesired formation of a passive surface layer (providing benefits similar to alloying aluminum (Al) with In, which helps to break down the passive hydroxide layer ($Al(OH)_3$) in Al-air batteries).

Figure 1B:
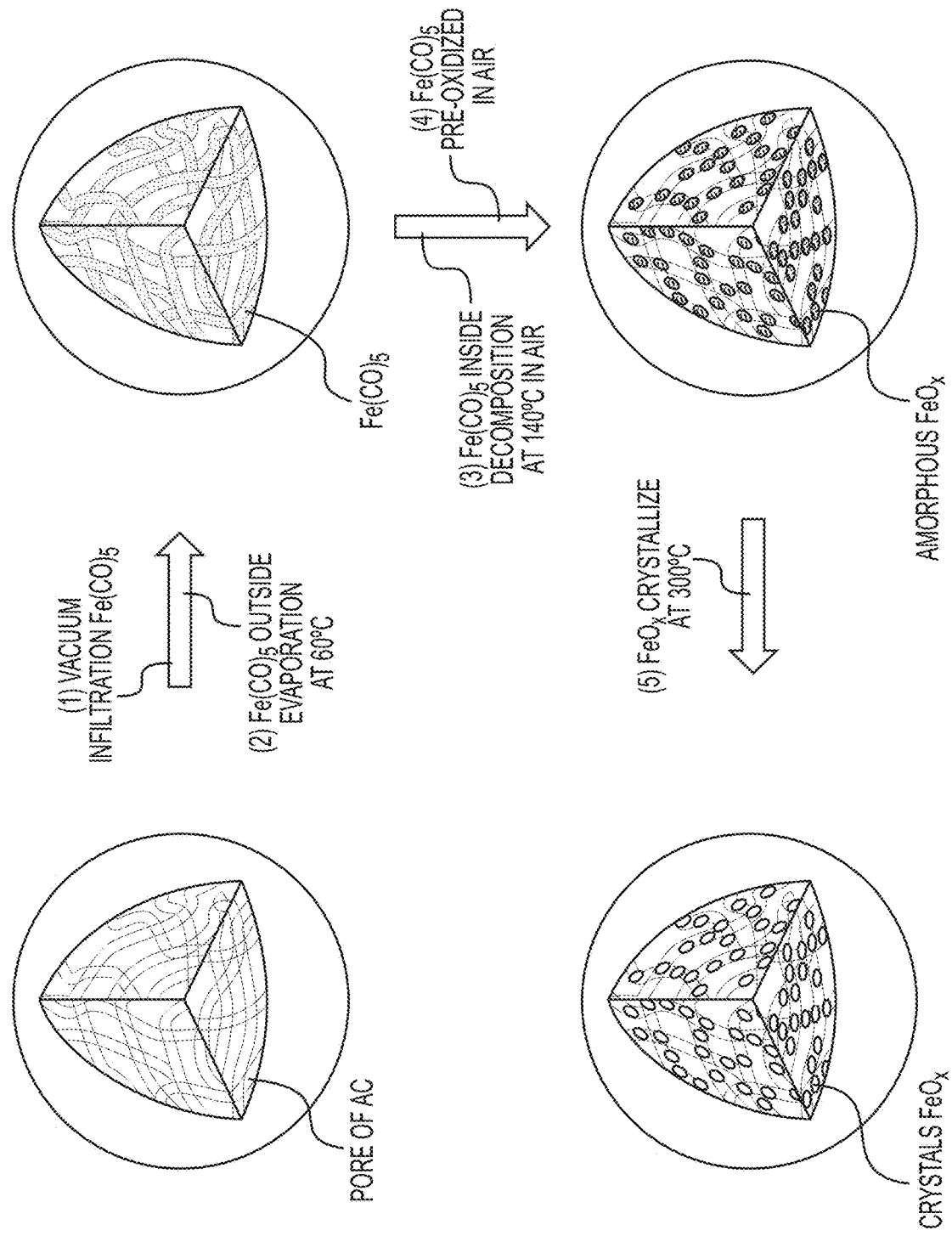
FIG. 1B is a schematic illustration of an example synthesis of $FeO_x/AC$ nanocomposites.

FIG. 1B illustrates an example implementation of the process of FIG. 1A in accordance with an embodiment of the disclosure. In particular, FIG. 1B shows a schematic illustration of an example synthesis of an $FeO_x/C$ nanocomposite, which involves several stages. Firstly, in the illustrated example, an $Fe(CO)_5$ precursor solution is infiltrated into the pores of activated carbon (AC) powders drop by drop with simultaneous carbon mixing. Good wetting and capillary condensation helps to promote uniformity of the produced material. During the second illustrated stage, the $Fe(CO)_5$/AC composite is heated (e.g., to about 60° C. or higher) to evaporate excess of $Fe(CO)_5$ from the surface of the AC. Annealing at elevated temperatures (e.g., about 140° C. or higher) (illustrated stage three) results in decomposition of infiltrated $Fe(CO)_5$ inside the pores to $Fe(CO)_x$ (x<5, ultimately to x=0 or pure Fe) and CO gas (which may be converted to various useful organic molecules in industrial settings). In an example, a different Fe precursor (e.g., such as iron oxide) may be produced during this annealing phase. Other Fe precursors may similarly be utilized for the formation of Fe-comprising nanoparticles and similarly various precursors of other metals may be utilized for the formation of nanoparticles comprising other metals.

Exposure of the produced samples to different gaseous materials or liquids will produce different types of secondary material (e.g., at 108A of FIG. 1). For example, exposure to air at room temperature (illustrated stage four) results in the formation of amorphous $FeO_x$ nanoparticles confined inside AC nanopores, which crystallize upon heating (e.g., at about 300° C. or higher) (illustrated stage five). To increase the mass loading of $FeO_x$ in the AC, stages one through three may be repeated. In an example, the active material particles may comprise at least 1 wt. % of $FeO_z$, where 1<z<1.8. Exposure to water vapors or aqueous solutions may result in the formation of hydroxide or oxyhydroxide nanoparticles instead of oxides nanoparticles. Exposure to hydrogen or hydrogen-containing gases may lead to the formation of metal hydride (e.g., $FeH_2$) nanoparticles. Exposure of metal nanoparticles to sulfur-containing gaseous or liquid environments may lead to the formation of metal sulfide (e.g., FeS) nanoparticles. Exposure of metal nanoparticles to fluorine-containing gaseous or liquid environments may lead to the formation of metal fluoride (e.g., $FeF_3$) nanoparticles. Similarly, exposure to other chemistries may lead to the formation of other metal salts (e.g., selenides, halides (e.g., metal fluorides, metal iodides, metal bromides, etc.), oxides, hydroxides, oxyhydroxides, etc.) of Fe, Cu, Li, Ni and many other metals and their combinations, as described previously. Mixed (e.g., metal-metal salt, including metal-metal oxide or metal-metal fluoride or metal-metal hydroxide, etc.) compositions (e.g., comprising one, two, three or more metals) may be also be obtained. Electroless deposition, electrodeposition, sol-gel, hydrothermal treatment, CVD, ALD and other solution-based and vapor-based material deposition/infiltration techniques (as well as heat-treatment, metal oxidation and metal salt reduction, etc.) and as their combinations may advantageously be utilized for active material deposition/infiltration. In some designs, active particles may additionally be coated with the protective surface layer of a distinctly different composition. In some designs, the thickness of the protective surface layer may range from about 0.2 nm to about 300 nm (more preferably from around 1 nm to around 20 nm, in some designs). electroless deposition, electrodeposition, sol-gel, hydrothermal treatment, CVD, ALD and other solution-based and vapor-based material deposition/infiltration techniques (as well as heat-treatment, metal oxidation and metal salt reduction, etc.) and as their combinations may advantageously be utilized for the deposition of the protective surface layer.

Figure 2A:
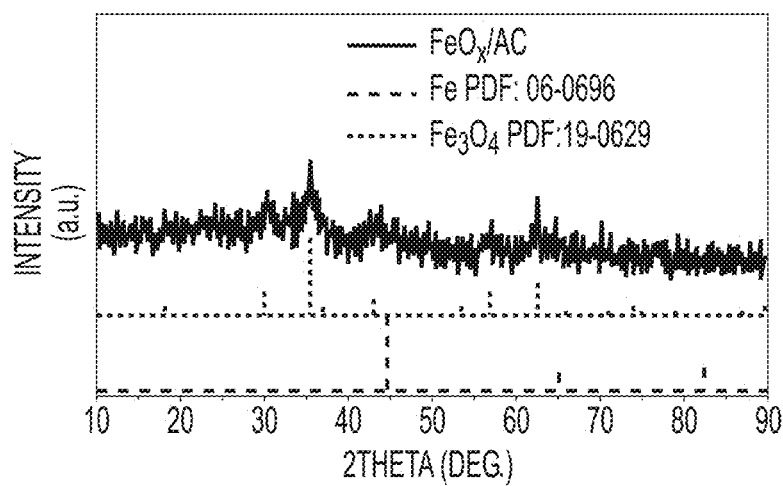
FIGS. 2A-2C illustrate XRD patterns of $FeO_x/AC$ (FIG. 2A); $N_2$ sorption-desorption isotherms of AC spheres with and without $FeO_x/AC$ loading (FIG. 2B); and pore size distribution of AC spheres with and without $FeO_x/AC$ loading (FIG. 2C).
Figure 2B:
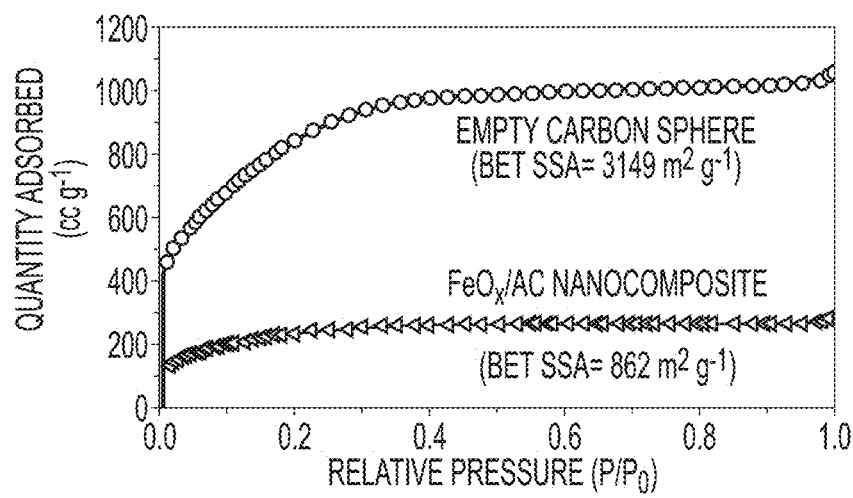

X-ray diffraction (XRD) analysis confirms formation of the Fe and $Fe_3O_4$ mixture, which can be ascribed to JCPDS card no. 06-0696 and 19-0629, respectively (FIG. 2A). All the diffraction peaks are broadened from the very small size of the nanoparticles restricted by the pore size of the AC. Iron oxide constitutes approximately 60 wt. % of the composite, as measured using thermo-gravimetric analysis (TGA) in air. Nitrogen sorption measurements of the AC before and after infiltration with $FeO_x$ nanoparticles reveal a decrease of Brunauer-Emmett-Teller (BET) specific surface area (SSA) from approximately 3150 $m^2 g^{-1}$ to approximately 860 $m^2 g^{-1}$ and pore volume from approximately 1100 cc $g^{-1}$ to approximately 300 cc $g^{-1}$ (FIG. 2B), as expected for $FeO_x$ confined into the carbon pores successfully. In some designs, it may be advantageous (e.g., to reduce side reactions) to reduce BET SSA further to below 500 $m^2 g^{-1}$ or below 100 $m^2 g^{-1}$ and in some designs—even below 5 $m^2 g^{-1}$. Such a reduction may be achieved by, for example, depositing higher amount of active particles or by subsequent sealing or infiltration with another material.

Figure 3A:
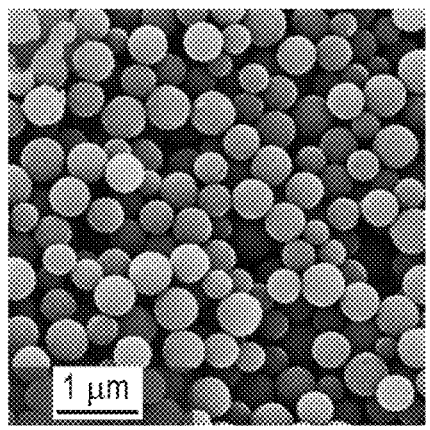
FIGS. 3A-3D illustrate SEM and TEM images of as-synthesized empty AC and $FeO_x/AC$: empty AC (FIGS. 3A and 3C); $FeO_x/AC$ (FIGS. 3B and 3D).
Figure 3B:
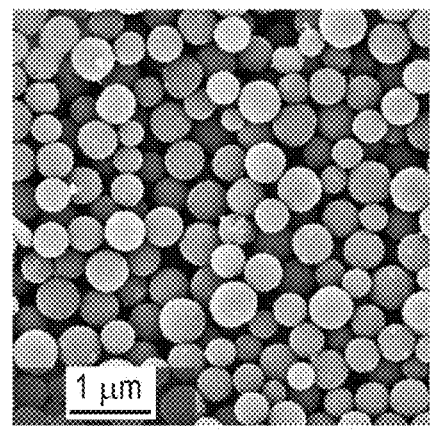
Figure 3C:
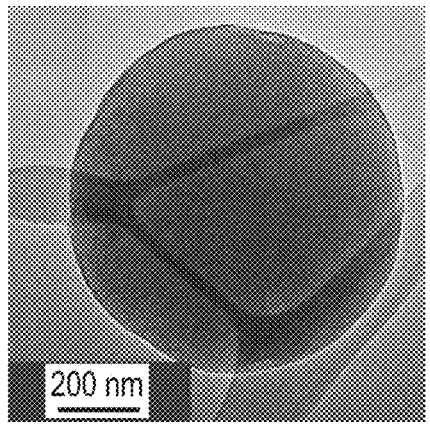
Figure 3D:
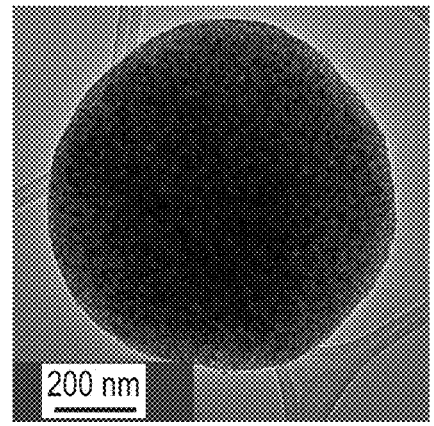
Figure 3E:
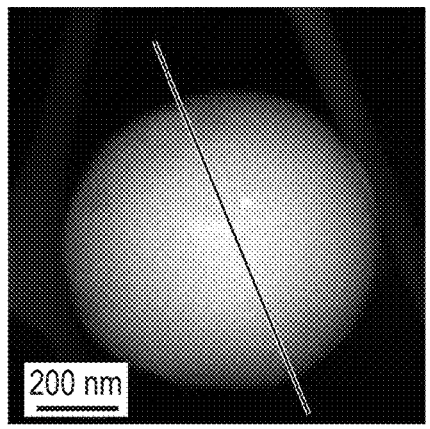
FIG. 3E-3F illustrate a STEM image (FIG. 3E) and EDS line scan result (FIG. 3F) of an $FeO_x/AC$ nanocomposite, showing uniform distribution of $FeO_x$ within a AC sphere.
Figure 3F:
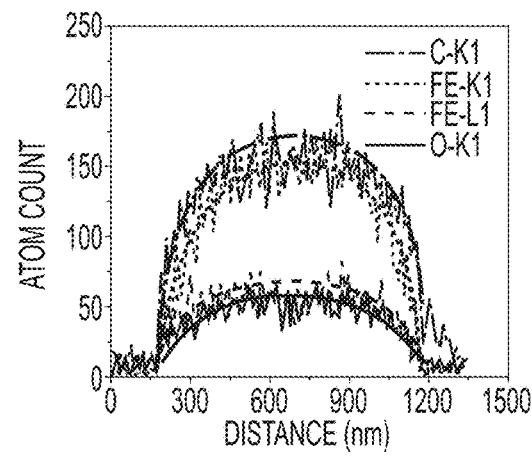

Scanning and transmission electron microscopy (SEM and TEM) studies further confirm uniform infiltration. SEM studies of both the empty AC spheres and the produced $FeO_x$/AC composite show very smooth particle surfaces (compare FIGS. 3A and 3b) and the absence of $FeO_x$ nanoparticles on the outer surface of the $FeO_x$/AC spheres (FIG. 3B), indicating high effectiveness of the impregnation procedure (FIG. 1B). FIGS. 3C-3D compare the TEM micrographs of an empty carbon sphere and a produced nanocomposite particle, further suggesting very uniform distribution of $FeO_x$ within individual spheres. FIG. 3E shows the so-called Z-contrast imaging of produced $FeO_x$/AC collected in the scanning transmission electron microscopy (STEM) mode of TEM. In a Z-contrast image (Z refers to the atomic number), the signal is proportional to the number of electrons per unit-illuminated area of a sample, which is strongly influenced by Fe (Z=26) and O (Z=8) atoms. Therefore, the uniformity of FeO within C can be directly visualized as a near perfect projection of a uniformly-dense spherical particle. Such observations can be additionally confirmed by energy-dispersive spectroscopy (EDS) line scan analysis, which shows that both Fe and O are distributed within the AC spheres uniformly (FIGS. 3E-3F).

Figure 2C:
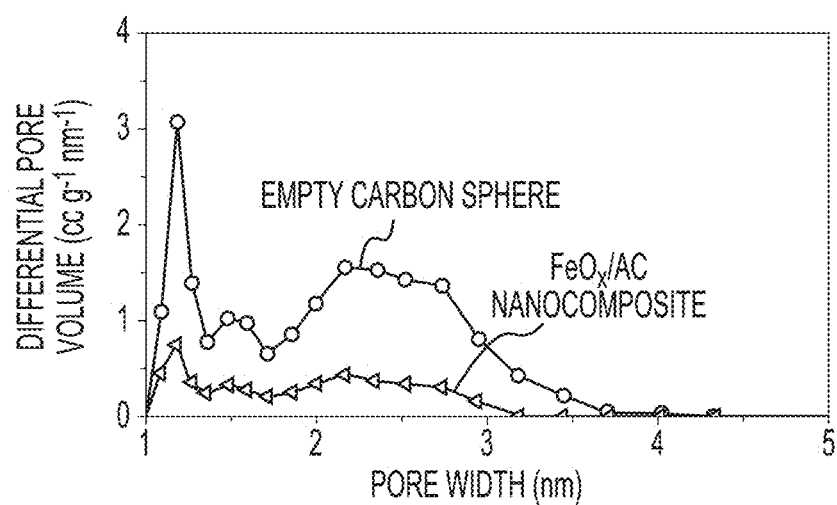

Electrochemical tests of the $FeO_x$/AC anode produced in accordance with the embodiment of FIG. 1B performed against a commercial $Ni(OH)_2$ cathode in aqueous alkaline electrolyte reveal several advantages. In this analysis, the cathode areal capacity exceeded that of the anode to make sure the overall performance was anode-limited. Mixture of Fe particles with an average size of 50-100 nm and AC (in identical proportion) was used as a reference anode material. Approximately 3 nm or smaller Fe or $FeO_x$ nanopowder (which may be desired for revealing the impact of the nanoconfinement since the nanoconfined particles may not exceed the AC average pore size, sub-3 nm, FIG. 2C) were not used because such a material was not commercially available. In addition, by using larger Fe nanoparticles (still significantly smaller than sintered multi-micron Fe powder used in commercial cells) in the benchmark electrodes, reasonable electrical conductivity of the electrode in the discharged (oxidized) state and reduced HER could be achieved. Certain commercial cells utilize a relatively high cut-off voltage (e.g., >1.35 V) to oxidize sintered Fe anodes incompletely to a mixture of Fe and $Fe(OH)_2$, which helps in preventing electrode pulverization and $Fe^{2+}$ dissolution into electrolyte and in keeping sintered particles electrically connected and electrochemically reversible. As a result, commercial cells allow thousands of stable cycles at the expense of relatively small capacity utilization (typically, approximately 100 $mAh/g_{Fe}$). In contrast, a low cut-off voltage testing (1.0 V in full cells) may be more revealing because over two-times higher cell-level energy density may be attained in this case. Such a low cut-off voltage should lead to Fe anode oxidizing to $Fe_3O_4$ during cell discharge.

Figure 4A:
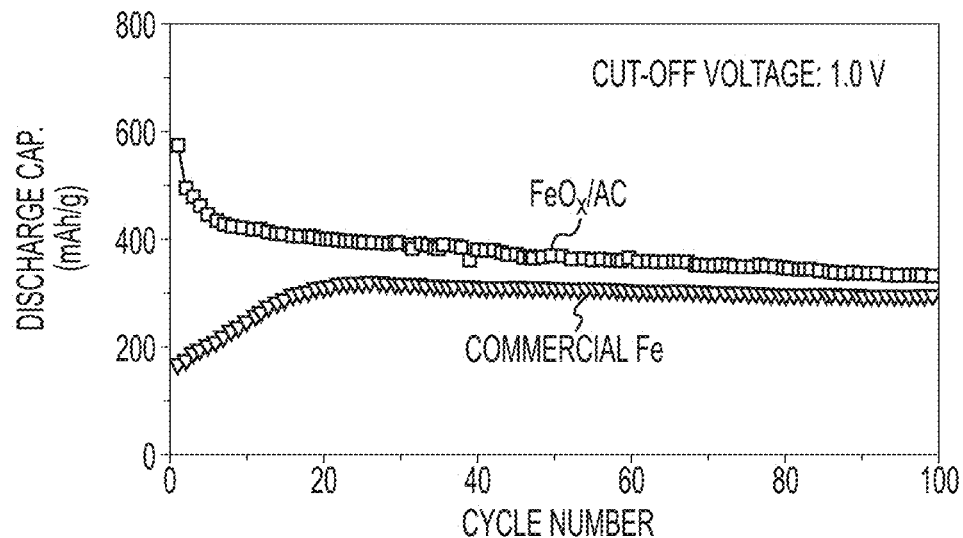
FIGS. 4A-4F illustrate example electrochemical characterizations of Ni—Fe batteries, including: long cycling performance of $FeO_x/AC$ and commercial Fe+AC at a cut-off voltage of 1.0 V (FIG. 4A); $FeO_x/AC$ and commercial Fe+AC at a cut-off voltage of 1.3 V (FIG. 4B); $FeO_x/AC+In(acac)_3$ at a cut-off voltage of 1.0 V (FIG. 4C); $FeO_x/AC+Na_2S$ at a cut-off voltage of 1.0 V (FIG. 4E); a voltage-capacity profile of $FeO_x/AC+Na_2S$ at a cut-off voltage of 1.0 V (FIG. 4D); and a voltage-capacity profile of $FeO_x/AC+In(acac)_3$ at a cut-off voltage of 1.0 V (FIG. 4F).
Figure 4B:
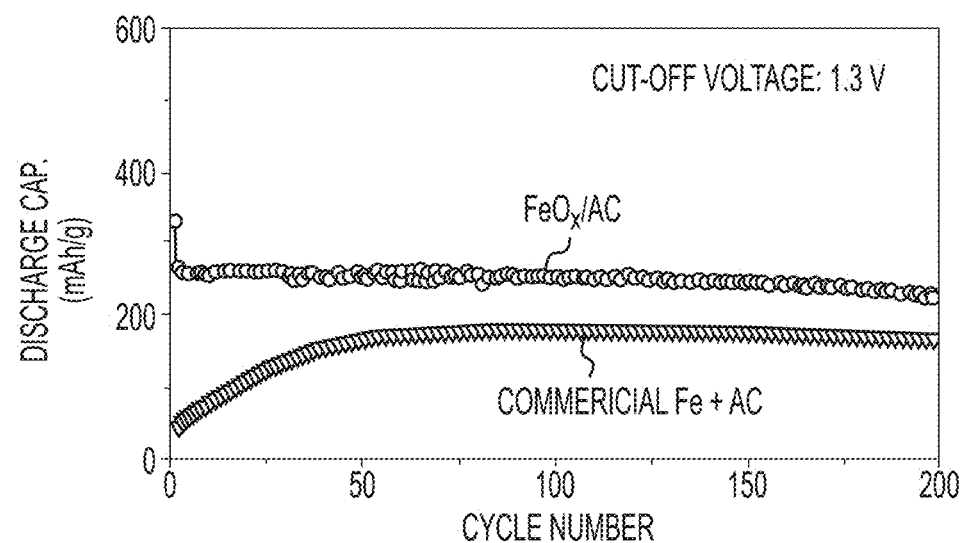
Figure 5A:
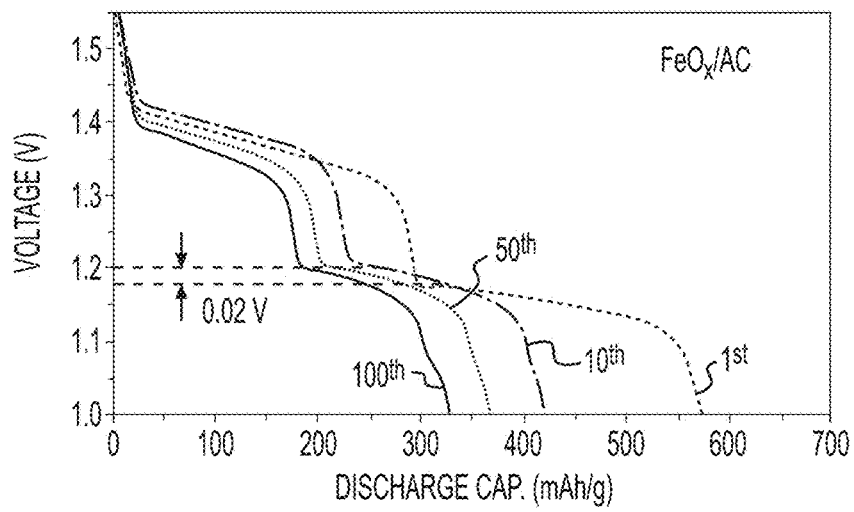
FIGS. 5A-5C illustrate voltage-capacity profiles of cell with $FeO_x/AC$ (FIG. 5A); commercial Fe+AC (FIG. 5B); and $FeO_x/AC+In_2O_3$ as anodes at a cut-off voltage of 1.0 (FIG. 5C).
Figure 5B:
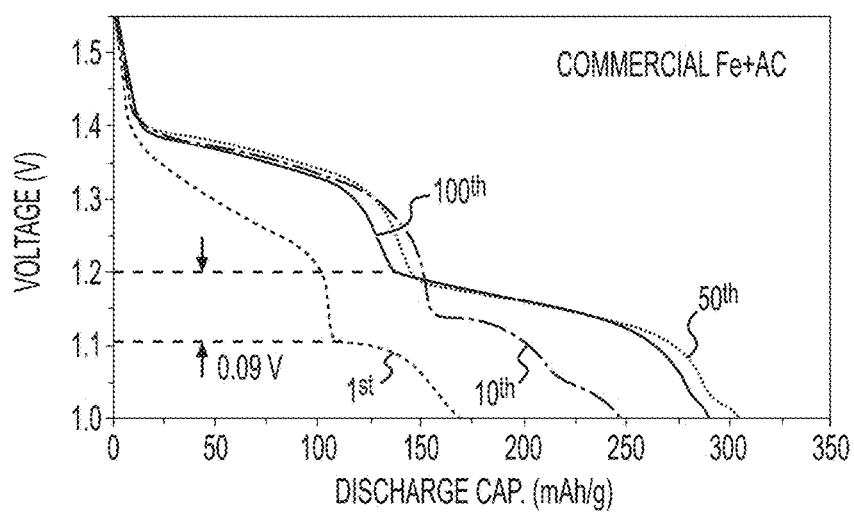

In contrast to commercial electrodes which typically exhibit extremely small capacity (e.g., 5-10 mAh/g) in the first cycle, the disclosed composite $FeO_x$/AC electrode produced in accordance with the embodiment of FIG. 1B showed first cycle capacity of approximately 570 mAh/g (FIG. 4A). The discharge curves show the expected two main plateaus, which are attributed to the formation of $Fe(OH)_2$ and $Fe_3O_4$, respectively (FIG. 5A). The benchmark electrode sample composed of larger nanoparticles mixed with AC showed modest initial capacity of 200 mAh/g (FIG. 4A). While the composite $FeO_x$/AC electrode can be seen to lose approximately 30% of the initial capacity within 50 cycles and another approximately 10% in cycles 50-100, total capacity within 100 cycles is remains consistent with or better than that of the benchmark electrode sample (FIG. 4A). The discharge profiles of both electrodes also look similar, while the benchmark electrode showed higher polarization than the produced $FeO_x$/AC electrode (FIGS. 5A-5B). Moreover, by increasing the cut-off voltage from 1.0 V to 1.3 V, the stability of the $FeO_x$/AC nanocomposite may be noticeably enhanced, with a capacity retention in excess of 85% being maintained after 200 charge-discharge cycles (FIG. 4B), with a tradeoff of a smaller electrode capacity of ~270 mAh/g.

In a further embodiment, the improvements to first cycle performance of the $FeO_x$ nanoparticles produced in accordance with the embodiment of FIG. 1B and confined in carbon nanopores may be further enhanced with several types of electrode additives (fillers) pre-infiltrated (e.g., infiltrated prior to the infiltration of the $Fe(CO)_5$ precursor solution in the process of FIG. 1B) into the nanocomposite pores, such as (i) $Na_2S$ and (ii) $In(acac)_3$ described below by way of example. The presence of these and other additive fillers may enhance accessible cell energy and stability.

Figure 4C:
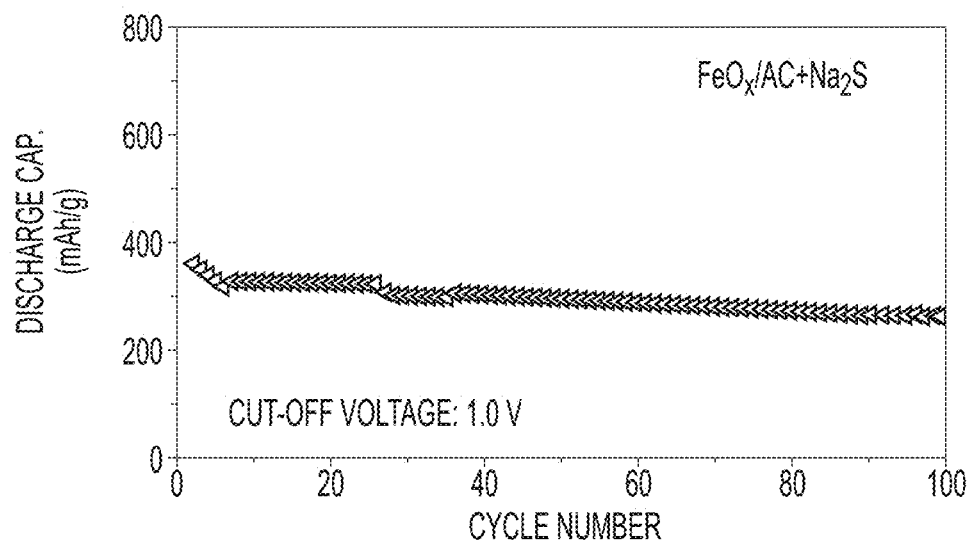
Figure 4D:
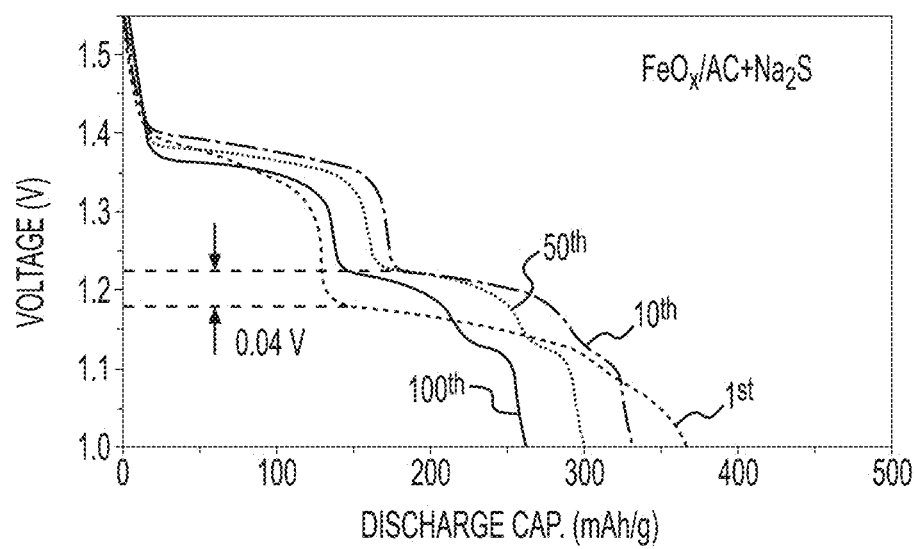

In an example, the distribution of a sulfide (such as $Na_2S$ in this example) directly on the surface of the active material (e.g., via pre-infiltration of the sulfide into the pores as a pore filler) may increase the electronic or ionic conductivity of the Fe electrodes by $S^{2-}$ adsorption on the electrode/electrolyte interface and the use of $Na_2S$ in particular may also provide an improvement in the ionic conductivity of the passive film because $Na^+$ may be incorporated into the passive layer. The estimated fraction of infiltrated $Na_2S$ salt may be in the range from about 0.01 to about 50 wt. % (for example, 5 wt. %). While the overall improvement illustrated in FIG. 4C may be modest, it may be further improved by addressing the small increase in the electrode mass after $Na_2S$ infiltration and the potential blocking (by adsorbed $Na_2S$) of some of the electrolyte from reaching active material. Possible ethanol residues (from $Na_2S$ solution infiltration) are unlikely to affect cell performance since these should readily dissolve into aqueous electrolyte (e.g., assuming the nanocomposite is not sealed with an electrolyte-impermeable seal). Increased discharge voltage plateaus of the $Na_2S$-containing electrode are also visible (FIG. 4D), suggesting the positive impact of $Na_2S$ in lowering electrode polarization. In general, $Na_2S$ may enhance the Fe anode activity by modifying its surface chemistry, for example by forming $NaFeS_2$, which should increase both electronic and ionic conductivity of the iron electrode and prevent rapid passivation.

The second example additive (or filler) noted above is an In-based organic compound, indium(III) acetylacetonate (In(acac)$_3$). Such an additive may provide various performance enhancements in certain applications. As an example, formation of an In-comprising layer on the electrode surface (at the electrode-electrolyte interface) may slow down HER due to significantly higher overpotential for $H_2$ evolution on In than on the Fe surface. As another example, In may prevent undesired formation of a passive surface layer on the active material. As discussed above, many organic salts other than acetylacetonate may be advantageously used in some designs. Similarly, many organic salts of metals other than In may also be advantageously used in some designs.

Figure 4E:
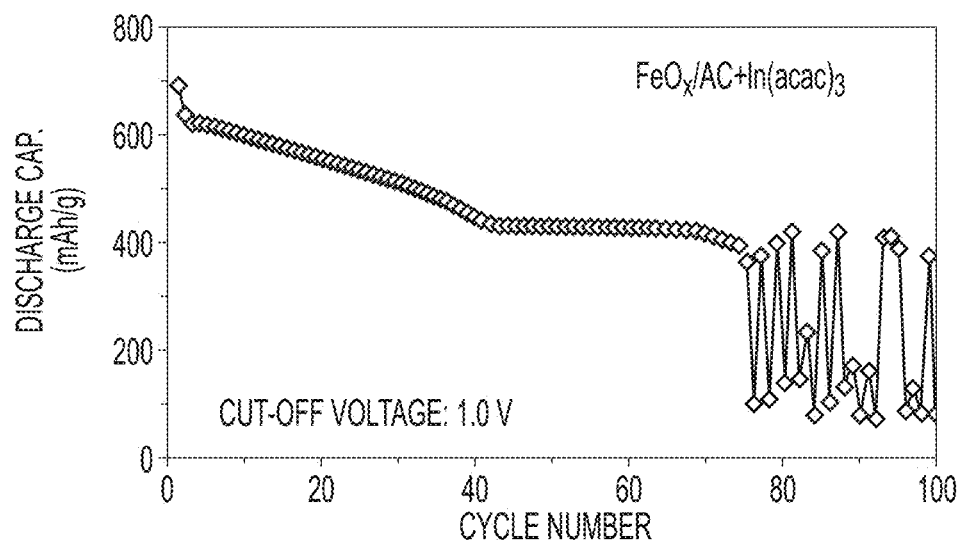
Figure 4F:
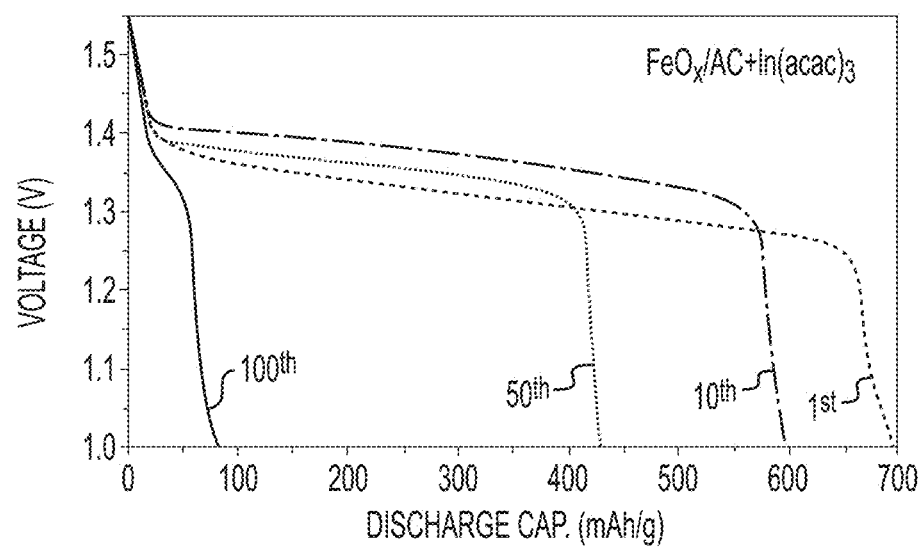
Figure 5C:
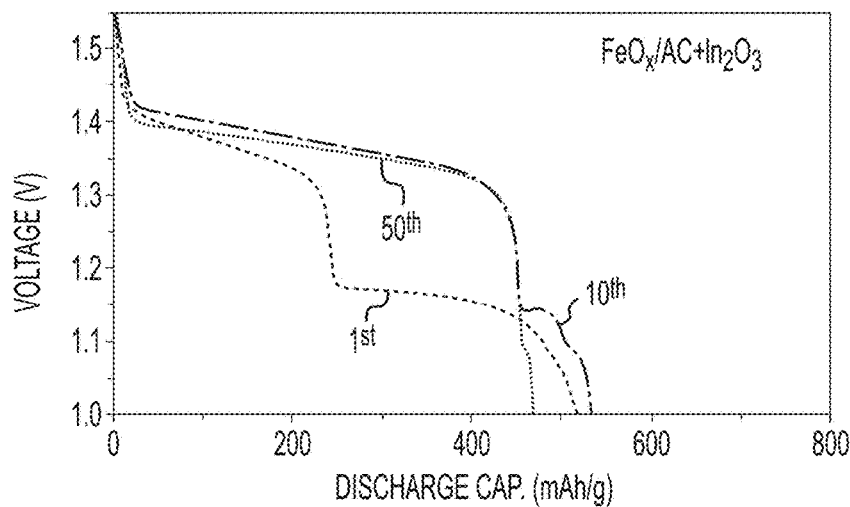

Electrochemical studies of the In(acac)$_3$ containing electrode show multiple unexpected results (FIGS. 4E-4F). First, the first cycle capacity of the electrode was remarkably high (approximately 700 mAh/g), which suggests that the capacity utilization is enhanced significantly. Because In(acac)$_3$ exhibits very low solubility in aqueous solutions, it was expected to at least partially block some of the pores. However, it evidently did not prevent access of electrolyte to active material. Due to relatively high reduction potential for In/In$^{3+}$ (−0.335 V vs. Ag/AgCl), the formation of an In-comprising surface layer on the Fe surface may be achieved. As discussed above, such a layer may enhance electrochemical activity of the Fe anodes. The second observation is that the higher voltage plateau (~1.37 V) increased by over two times, while the low voltage plateau (~1.15 V) almost completely disappeared. This is highly advantageous for practical applications because it increases average cell potential and simplifies battery electronics. Such an unusual electrochemical behavior may suggest a direct oxidation of Fe to $Fe_3O_4$ without an intermediate phase of $Fe(OH)_2$. Because this phenomenon is also observed in cells with $In_2O_3$ as an additive (FIG. 5C), it is believed that In or In-comprising ions act as catalyst(s) for oxidation of Fe. Because oxidation from Fe to $Fe(OH)_2$ is accompanied by the largest volume changes (of 372%), avoiding this phase formation reduces internal stresses). In addition, because physical constraints to the needed volume changes may reduce capacity utilization, avoiding $Fe(OH)_2$ phase formation may potentially contribute to the higher capacity achieved (FIG. 4F). The third observation is excellent capacity retention for the first approximately 5 cycles (compared to pure FeO$_x$/AC electrode or the electrode with $Na_2S$ additives). As discussed in more detail below, capacity decay in the disclosed electrodes correlates with active material dissolution and re-precipitation. It is conceivable that an electro-deposited In surface layer may reduce the dissolution of Fe. At the same time, during charging In should at least oxidize (e.g., forming $InO_2^-$) and partially dissolve in electrolyte until the concentration of $InO_2^-$ eventually reaches saturation in the electrolyte. In general, In doping or incorporation into a metal anode may provide multiple benefits (e.g., improving electrical contact with the current collector, enhancing electrode stability, reducing side reactions with electrolyte and improving kinetics). Based on this and the approximately 0.28 at. % solubility of In in Fe at room temperature, it is believed that some portion of In may also be incorporated in the surface layer on active material. Interestingly, in cycles 40-70, stability of cells with different electrode additives become comparable and their capacities remain within approximately ±20%, suggesting that by the 40$^{th}$ cycle the effectiveness of additives become diminished. Furthermore, it was observed that after approximately 70 cycles, cells with In(acac)$_3$ additives started to exhibit very significant oscillations in capacity. This was observed in multiple cells. As discussed in more detail below, such cycle-to-cycle capacity variations may be related to structural changes in the electrodes and the associated blocking of the active anode surface.

Figure 6A:
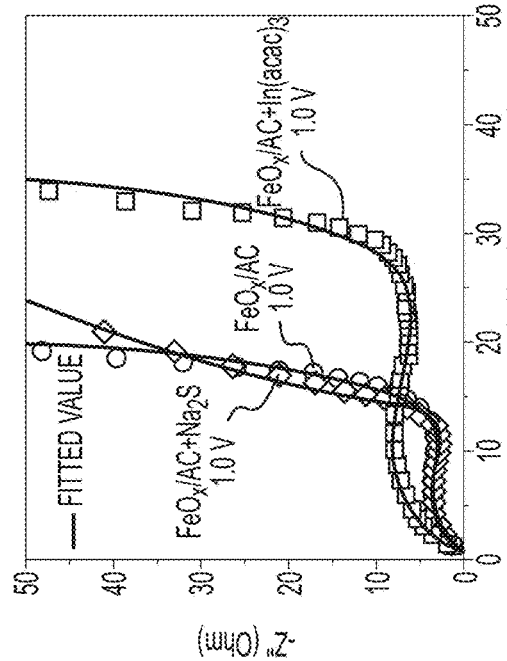
FIGS. 6A-6D illustrate example EIS characterizations, including: a comparison of Nyquist plots of Ni—Fe batteries made with $FeO_x/AC$ and commercial Fe+AC after 100 cycles (FIG. 6A); a comparison of Nyquist plots of Ni—Fe batteries made with $FeO_x/AC$, $FeO_x/AC+Na_2S$ and $FeO_x/AC+In(acac)_3$ after 100 cycles (FIG. 6B); a comparison of Nyquist plots of Ni—Fe batteries made with $FeO_x/AC+In(acac)_3$ after different cycles (FIG. 6C); and an equivalent circuit used for fitting the EIS (FIG. 6D).
Figure 6B:
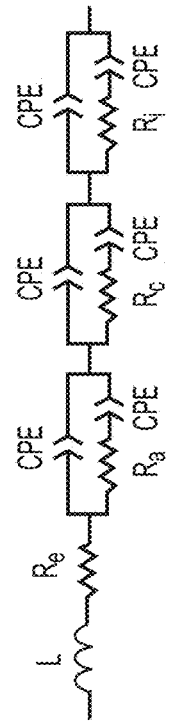
Figure 6C:
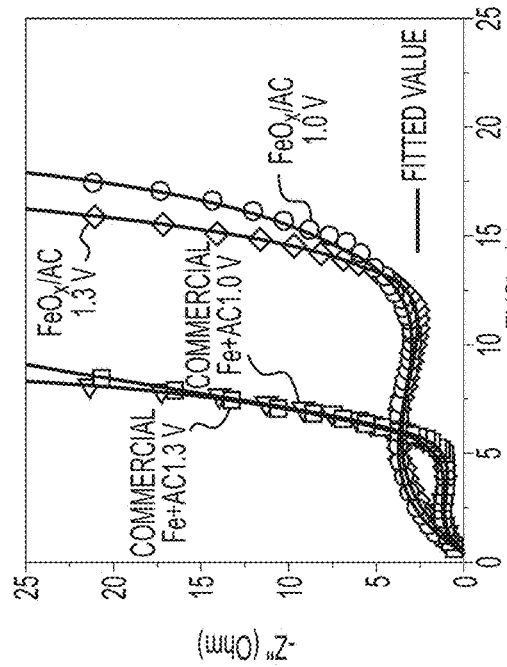
Figure 6D:
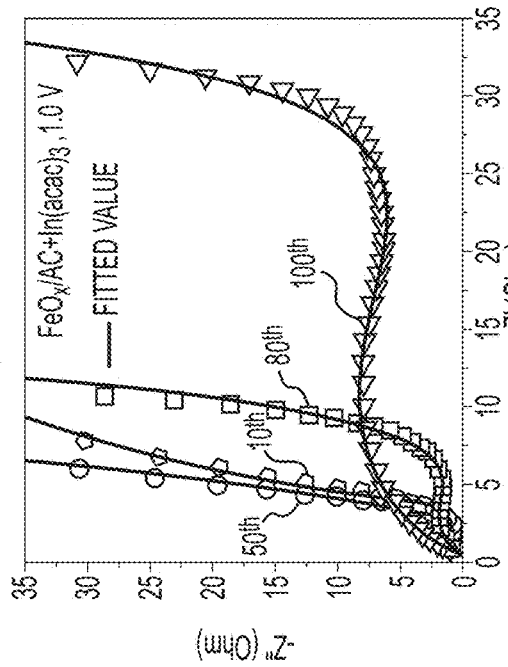

EIS analyses provide complementary insights about the influence of cut-off voltage and additives on the performances of example FeO$_x$/AC electrodes produced in accordance with the process of FIG. 1B. Experimental Nyquist and Bode plots (example Nyquist plots shown in FIGS. 6A-6C) of full cells incorporated the above-noted example FeO$_x$/AC electrodes were fitted using the equivalent circuit, as shown in FIG. 6D. Table 1 shows the calculated values for the Ohmic (mostly electrolyte) resistance ($R_e$), the charge transfer resistance of the anode ($R_a$), the charge transfer resistance of the cathode ($R_c$), and the electrode/electrolyte interface resistance ($R_i$) of the full cells. The discussion here is limited to the $R_a$ and $R_i$ contributions because the overall performance is anode-limited.

TABLE 1

Impedance parameters derived using equivalent circuit model for Ni—Fe batteries at discharged state.

| Anodes | Cut-off Voltage (V) | Cycle number | $R_e$ (Ω) | $R_a$ (Ω) | $R_c$ (Ω) | $R_i$ (Ω) |
|---|---|---|---|---|---|---|
| Commercial Fe + AC | 1.0 | 100 | 0.3 | 6.6 | 0.1 | 1.8 |
|  | 1.3 | 100 | 0.3 | 4.6 | 0.2 | 1.9 |
| FeO$_x$/AC | 1.0 | 100 | 0.3 | 9.5 | 0.1 | 6.6 |
|  | 1.3 | 100 | 0.1 | 6.5 | 0.1 | 7.2 |
| FeO$_x$/AC + Na$_2$S | 1.0 | 100 | 0.1 | 4.9 | 0.1 | 9.3 |
| FeO$_x$/AC + In(acac)$_3$ | 1.0 | 10 | 0.2 | 2.3 | 0.1 | 3.1 |
|  |  | 50 | 0.4 | 3.9 | 0.2 | 1.8 |
|  |  | 80 | 0.4 | 4.0 | 0.4 | 4.3 |
|  |  | 100 | 0.3 | 16.7 | 0.002 | 8.8 |

While the initial FeO$_x$/AC-based cell showed lower $R_a$ resistance than the initial benchmark cell based on a larger size commercial Fe nanopowder, after the first 100 cycles the resistance of the FeO$_x$/AC increased and the trend reversed. More specifically, a higher $R_a$ is observed (9.5 Ohm for a 1.0 V cut-off voltage after 100 cycles, 6.5 Ohm for a 1.3 V cut-off voltage after 100 cycles) for the cycled FeO$_x$/AC-based cell than that of the cycled benchmark cell (6.6 Ohm for 1.0 V after 100 cycles, 4.6 Ohm for 1.0 V after 100 cycles). The substantial increase in the $R_a$ resistance of the FeO$_x$/AC-based cells may indicate significant changes in the electrode morphology. This may not be extremely surprising because of the previously observed dissolution and re-precipitation of Fe$_3$O$_4$ in the form of a nanoporous, nanocrystalline powder. When increasing the cut-off voltage, the $R_a$ of the cells is reduced while the $R_i$ remains almost the same (FIG. 6A, Table 1). This suggests faster reaction kinetics at higher cut-off voltages, which, in turn, may lead to higher capacity retention (due to higher fraction of the total charging current being consumed by electrodes compared to a side reaction), as observed and discussed above (FIG. 4B). With the addition of Na$_2$S, the corresponding total resistance ($R_a$+$R_i$) of the cell decreases from 16.1 to 14.2 Ohm. This is consistent with slightly lower polarization, as discussed above (FIG. 4D). The EIS of In(acac)$_3$-comprising cells after 10, 50, 80 cycles (FIG. 6C) shows a large gradual resistance increase (to approximately 25.5 Ohm). When compared to other cells (FIG. 6B) In(acac)$_3$-comprising cells show the largest resistance. This larger resistance (polarization) growth correlates well with the capacity fluctuations (FIG. 4E).

Figure 7:
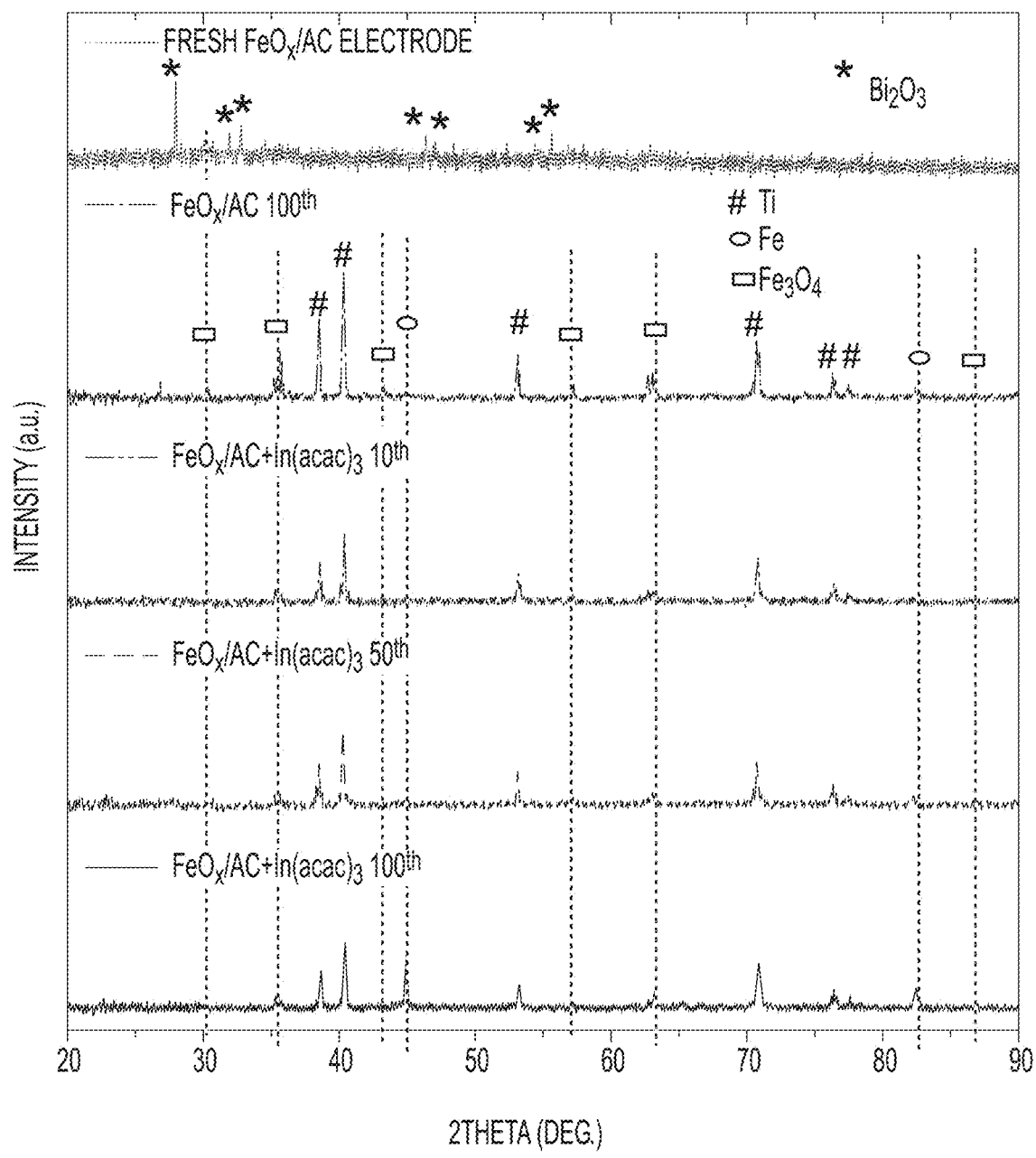
FIG. 7 shows example XRD patterns of a fresh anode and cycled anodes in a discharged state.
Figure 8A:
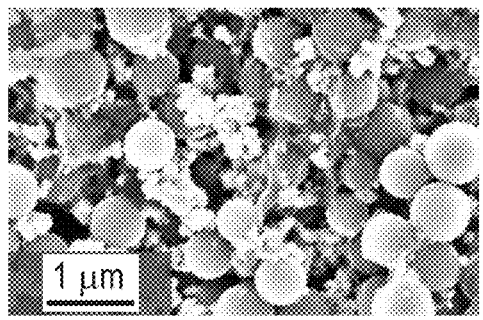
FIGS. 8A-8F illustrate example SEM micrographs of cycled anodes in a discharged state after 100 cycles, including: $FeO_x/AC$ at a cut-off voltage of 1.0 V (FIG. 8A); $FeO_x/AC$ at a cut-off voltage of 1.3 V (FIG. 8B); commercial Fe+AC at a cut-off voltage of 1.0 V (FIG. 8C); commercial Fe+AC at a cut-off voltage of 1.3 V; $FeO_x/AC+Na_2S$ at cut-off voltage of 1.0 V (FIG. 8E); and $FeO_x/AC+In(acac)_3$ at cut-off voltage of 1.0 V (FIG. 8F).
Figure 8B:
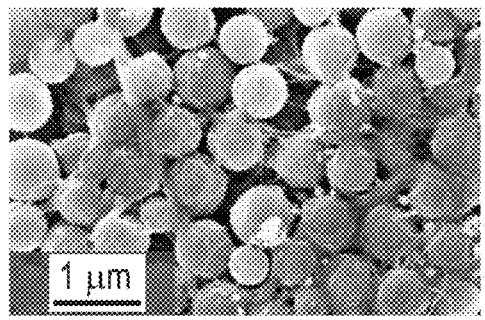
Figure 8C:
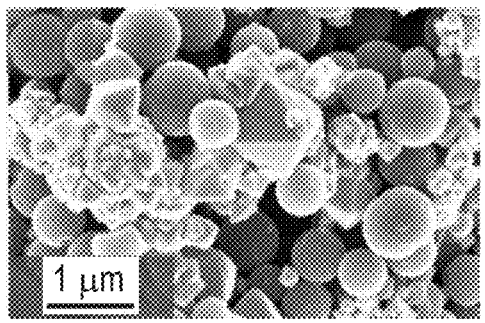
Figure 8D:
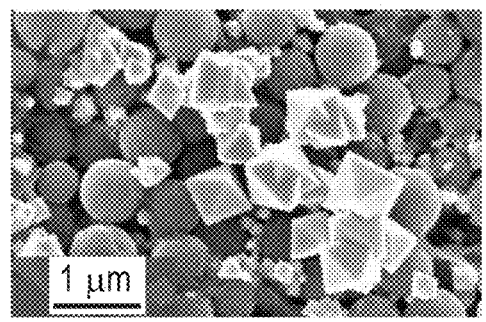
Figure 8E:
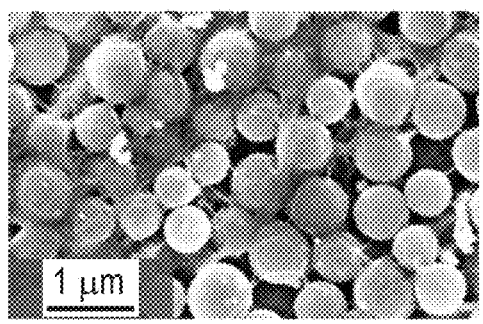
Figure 8F:
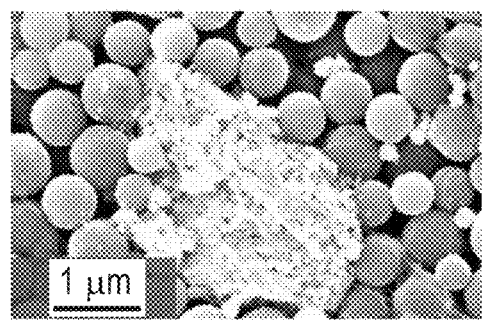
Figure 9B:
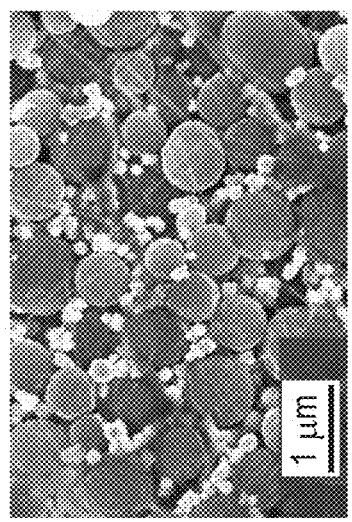
FIGS. 9A-9B illustrate example SEM micrographs of fresh $FeO_x/AC$ (FIG. 9A); and commercial Fe+AC (FIG. 9B).
Figure 9A:
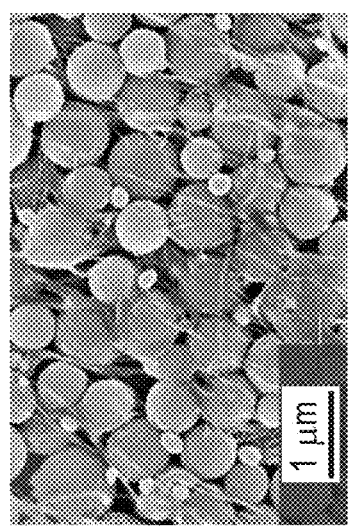

X-ray diffraction (XRD) of cycled anodes (in the discharged state) reveals the presence of both $Fe_3O_4$ and Fe in the anodes after 100 cycles (FIG. 7). The presence of Fe peaks indicates that some portions of the anode become inactive over time. The most dramatic increase in the Fe peak was observed in cells comprising In(acac)$_3$ after 100 cycles when the capacity dropped significantly (FIG. 4E). At the same time, the intensity of $Fe_3O_4$ and Fe peaks in the electrodes with In(acac)$_3$ at the $10^{th}$ and $50^{th}$ cycle are similar with the pure $FeO_x$/AC electrode, which is consistent with their capacity retention at these cycles.

SEM studies show dramatic changes in the electrode morphology after cycling (FIGS. 8A-8F, FIGS. 9A-9B). First, significant number of Fe/FeO$_x$ particles are observed outside the AC spheres in all FeO$_x$/AC nanocomposite samples. These are produced by Fe/FeO$_x$ dissolution from the inner pores of the FeO$_x$/AC nanocomposites and their re-precipitation on the outer surface. When normalized by the BET SSA (nearly 900 m$^2$ g$^{-1}$) the dissolution is relatively moderate, but may become more significant over time. This irreversible dissolution-precipitation process may contribute to performance degradation (capacity fade) because newly formed particles do not have direct contact with conductive additives.

In some designs, it may be advantageous to prevent direct contact between active material and liquid electrolyte by, for example, filling or coating active material particles (for example, Fe/FeO$_x$ or others) or active material-comprising composites (for example, carbon-Fe/FeO$_x$ composites, such as activated carbon-Fe/FeO$_x$ nanocomposites) with a solid (for example, polymer) electrolytes (for example, those that exhibit high conductivity for OH$^-$ ions, as described and discussed earlier). In this case dissolution and re-precipitation of the active material may be significantly reduced or (in an ideal case) completely or almost completely avoided (for example, by preventing formation of HFeO$_2^-$ ions and their dissolution into a liquid electrolyte). At the same time, the electrochemical reaction rates may still be kept sufficiently (for certain applications) high as soon as the electrically conductive portion of the composite provides rapid supply of electrons to the electrochemical reaction sites and the polymer electrolyte also provides rapid supply of electrochemically active ions (for example, OH— ions in case of alkaline batteries) to the electrochemical reaction sites. While in some cases the electrochemical reactions may proceed faster via dissolution and the participation of the dissolved intermediates (for example, by reducing energy barrier for the reaction or increasing the number of the reaction pathways or reaction sites), by keeping the size of the active particles sufficiently small and both electronic and ionic conductivity of the composites sufficiently high, acceptable reaction rates may be obtained.

The suitable size of the active material may depend on the particular chemistry, operational conditions of a cell (temperature, average time of charge or discharge, required pulse power density, etc.), the suitable size or the average characteristic dimensions for the ion diffusion from the surface of the active material to its bulk typically ranges from around 1 nm to around 3 micron (in some designs, from around 2 nm to around 100 nm). Smaller than 1 nm average size may often undesirably increase side reactions, reduce activity of the material and reduce volumetric capacity of the composites. When larger than 3 microns (in some cases larger than some smaller dimensions), active material particle size may often undesirably reduce reaction rates and capacity utilization under normal operating conditions. Interestingly, in some designs initially large active material particles may gradually break into smaller particles upon cycling. While in some cases such a particle pulverization may lead to capacity fading and cell failure, in other cases (for example, in some cases when a deformable solid electrolyte coating or infiltration layer is employed) such a behavior surprisingly and unexpectedly does not lead to substantial loss of capacity and may even enhance rate performance and capacity utilization with cycling.

Figure 10:
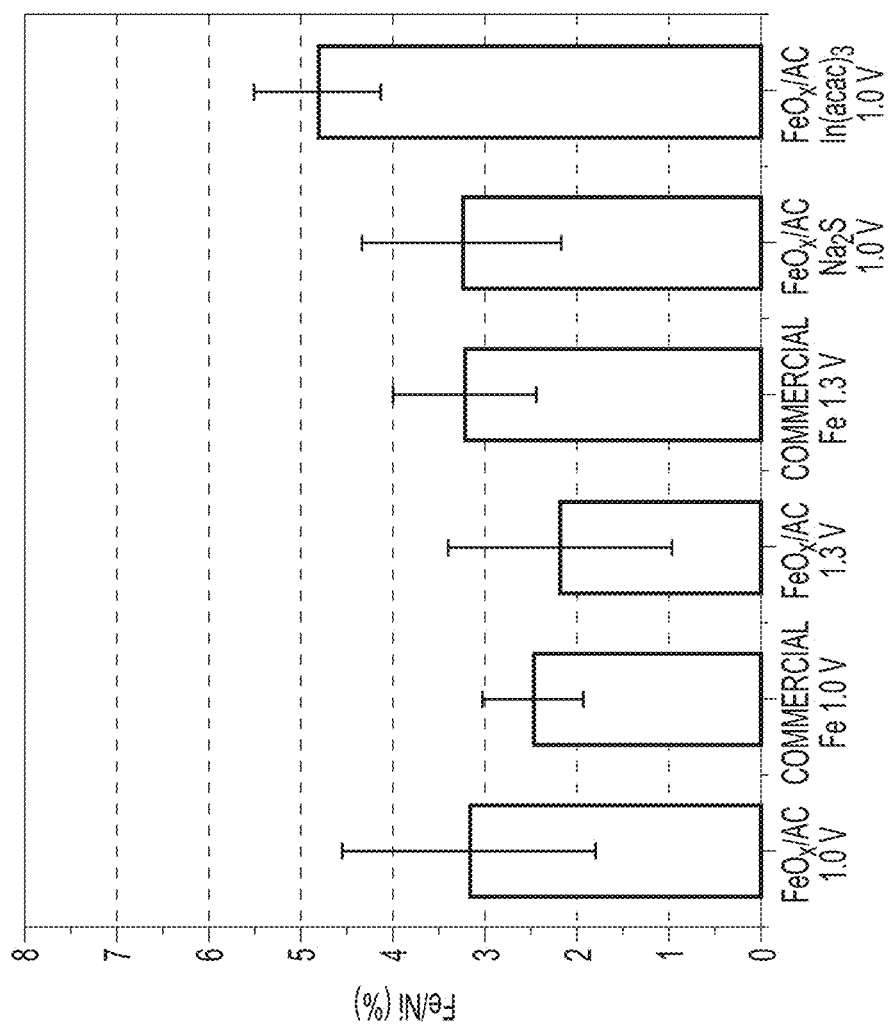
FIG. 10 illustrates an example EDS of cycled cathodes in a discharged state.

Both the cut-off voltage and additives affect morphology and the degree of Fe dissolution from example FeO$_x$/AC electrodes produced in accordance with the process of FIG. 1B. For example, using 1.3 V as a cut-off voltage results in noticeably fewer FeO$_x$ particles formed on the outer surface of the AC spheres (compare FIGS. 8A and 8B, or 8C and 8D), in full agreement with the improved stability observed in cells cycled at a higher cut-off voltage (compare FIGS. 4B and 8E). The comparison of the amount of Fe on the Ni cathodes (which is expected to be proportional to the amount of the dissolved Fe) as measured by Energy Dispersive X-Ray Spectroscopy (EDS) also confirms this (FIG. 10). Comparing the morphologies of FeO$_x$/AC nanocomposites and benchmark electrodes composed of the mix of commercial Fe nanoparticles and AC particles (cycled at both 1.0 V and 1.3 V cut-off voltage limits), larger and more crystalline particles are observed in the benchmark electrodes (compare FIGS. 8A and 8C, or FIGS. 8B and 8D). This suggests that nanoconfinement helps to mitigate the dissolution-precipitation in certain applications and is particularly impressive considering the much smaller size of the nanoconfined particles (which should exhibit much faster dissolution due to their higher surface energy and higher surface area). The well-defined shape of the crystals formed in the benchmark samples (FIGS. 8C and 8D) is likely related to their repeated dissolution-growth on the surface of the large pre-existing particles.

When comparing the effect of additives, the addition of Na$_2$S is observed to reduce the dissolution considerably, while the addition of In(acac)$_3$ had minimal impact on the dissolution (compare FIGS. 8E and 8F), the degree of which was similar to that observed in the pure FeO$_x$/AC electrode. It is believed that Na$_2$S may enhance heterogenous nucleation/deposition of the re-precipitated Fe back onto the surface of the nanoconfined Fe/FeO$_x$. It is also possible that the presence of Na$_2$S somewhat reduces the solubility of HFeO$_2^-$ ions into electrolyte. In contrast, the presence of In(acac)$_3$ and the expected electrodeposition of In onto the surface of nanoconfined Fe/FeO$_x$ may trigger homogeneous nucleation and growth of new particles outside of the AC spheres. The adsorption of the organic tail of the salt (acetylacetonate) into the carbon nanopores (porous carbon is an excellent absorber of various organic species) may also contribute to reduced re-deposition of Fe within the nanopores. The spherical shape and high number of re-deposited nanoparticles (FIG. 8F) support the homogeneous nucleation and growth theory. The significantly agglomerated large particles formed in the samples with In(acac)$_3$ (FIG. 8F) substantially reduce the outer surface area. As a result, In electro-deposited on their surface may block electrochemical activity of Fe, leading to dramatic cycle-to-cycle capacity oscillation (after approximately 70 cycles in FIG. 4E).

Figure 11A:
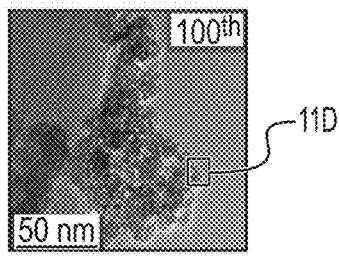
FIGS. 11A-11L illustrate example TEM micrographs of cycled anodes in a discharged state after cycling, including: $FeO_x/AC$ at a cut-off voltage of 1.0 V (FIGS. 11A and 11D); $FeO_x/AC$ at a cut-off voltage of 1.3 V (FIGS. 11B and 11E); $FeO_x/AC+Na_2S$ at cut-off voltage of 1.0 V (FIGS. 11C and 11F); and $FeO_x/AC+In(acac)_3$ at cut-off voltage of 1.0 V (FIGS. 11G-11L).
Figure 11B:
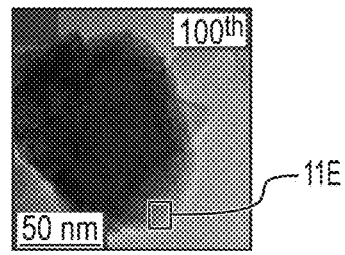
Figure 11C:
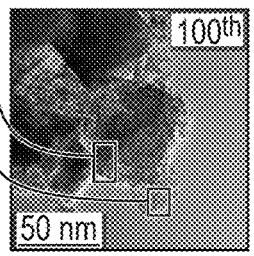
Figure 11D:
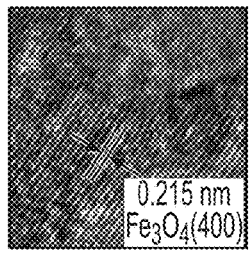
Figure 11E:
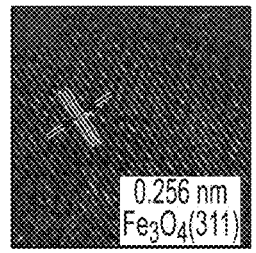
Figure 11F:
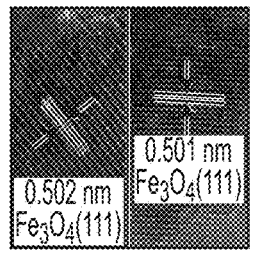
Figure 11G:
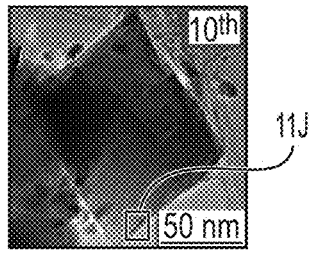
Figure 11H:
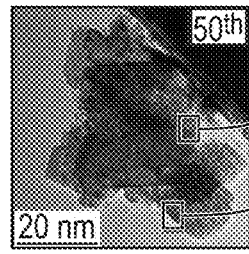
Figure 11I:
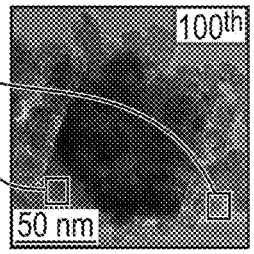
Figure 11J:
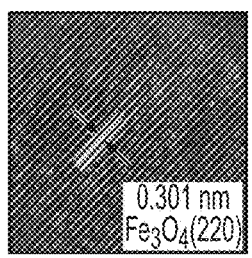
Figure 11K:
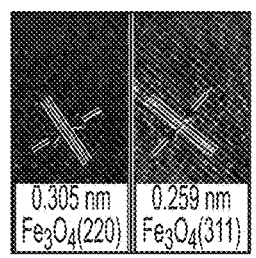
Figure 11L:
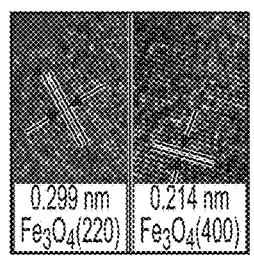
Figure 12A:
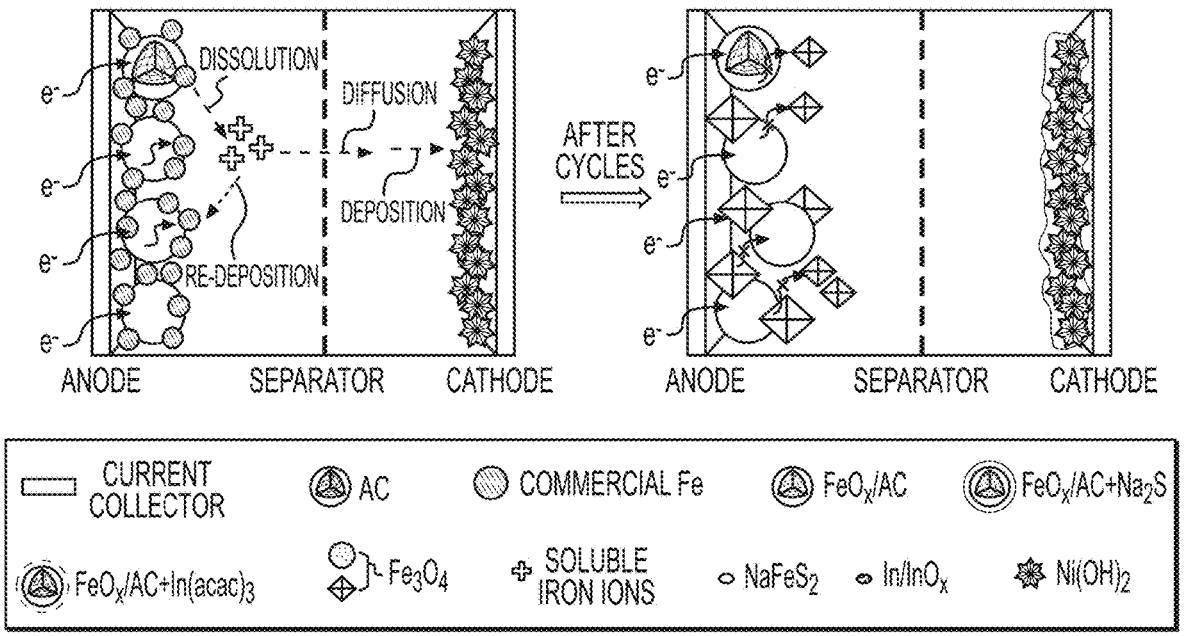
FIGS. 12A-12D illustrate example schematics of the cycling process of conventional electrodes and $FeO_x/AC$ nanocomposite-based electrodes.
Figure 12B:
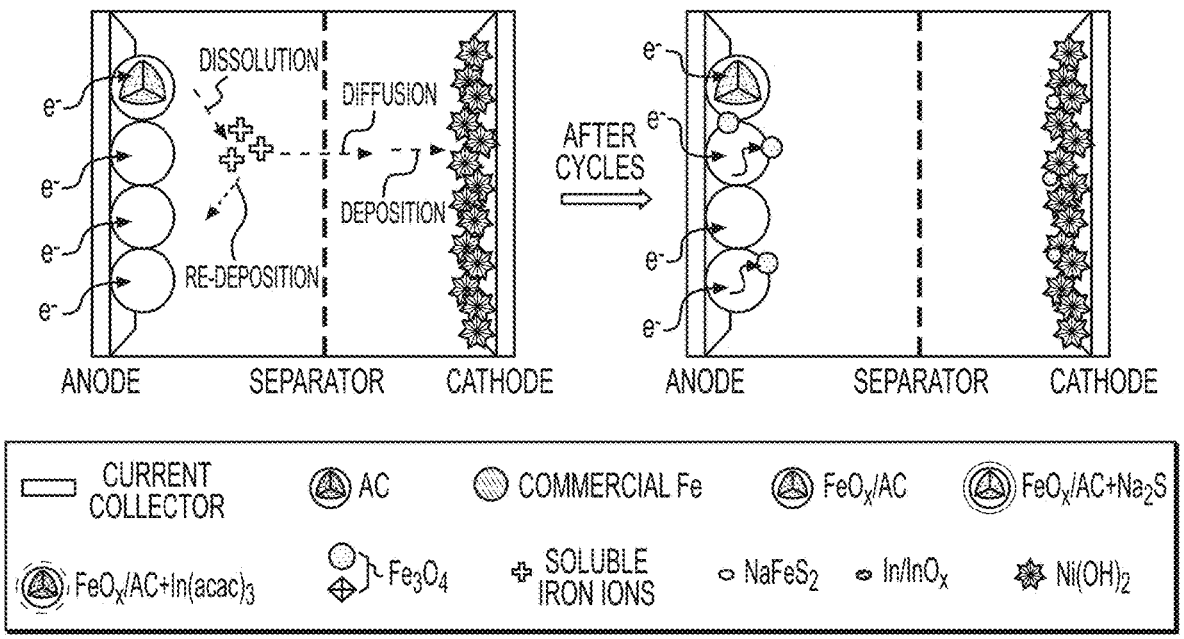
Figure 12C:
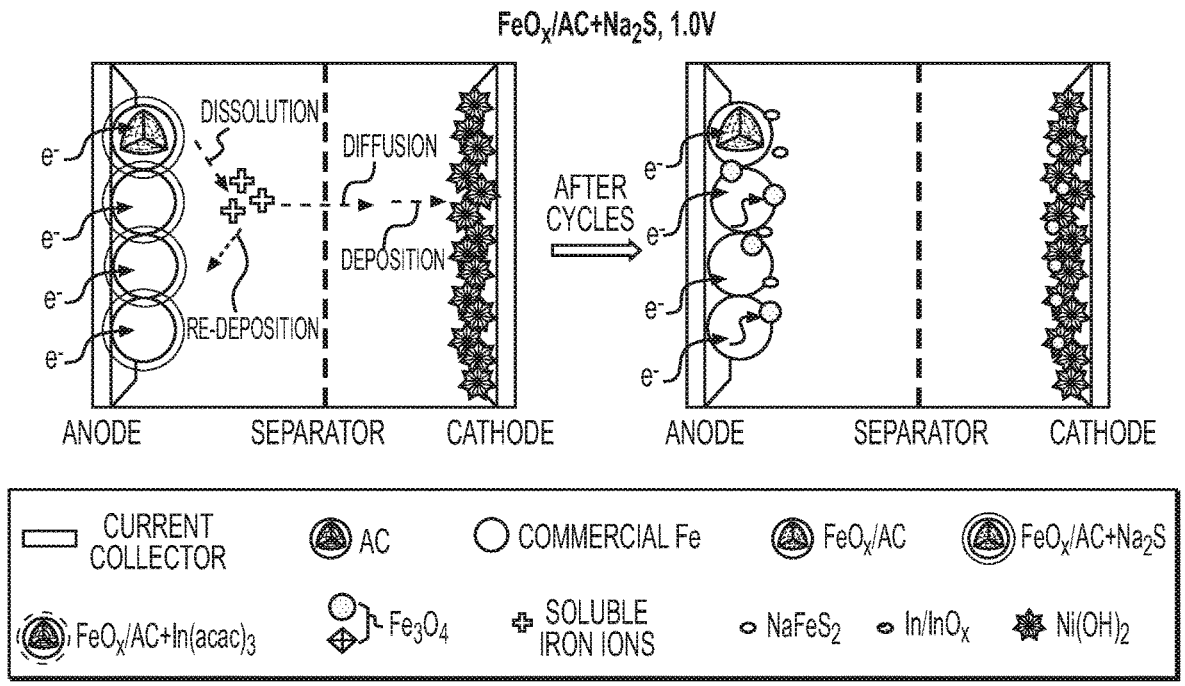
Figure 12D:
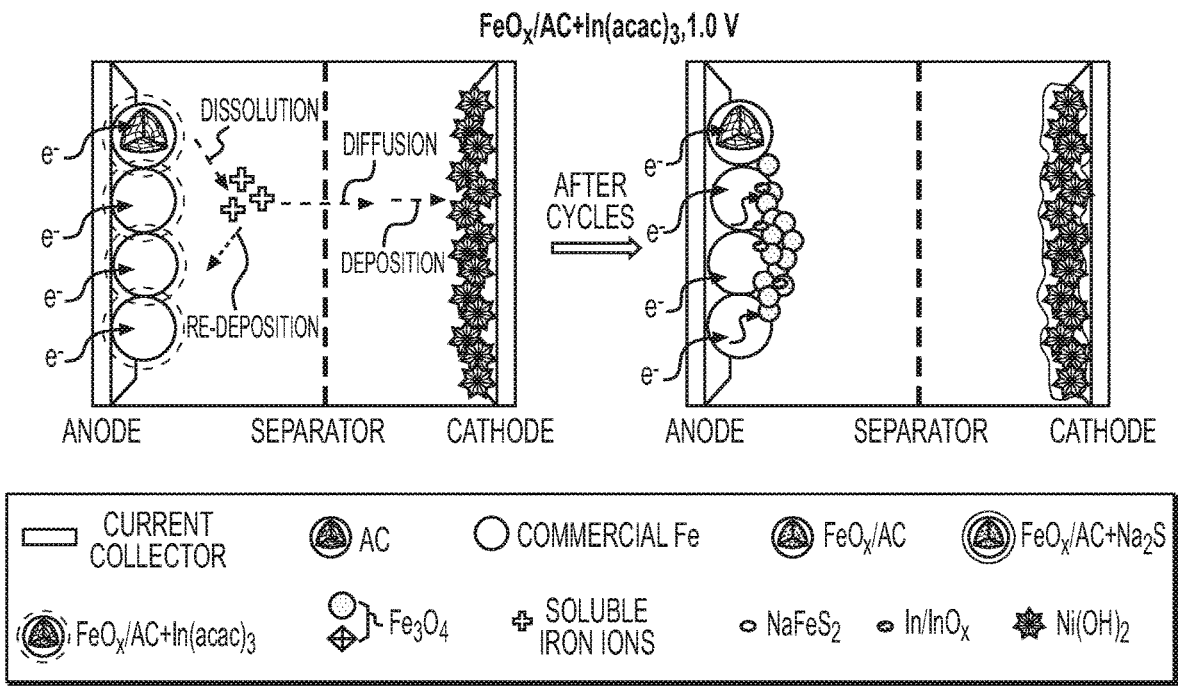

TEM studies show that the majority of re-precipitated particles in products of all the cycled and discharged (oxidized) electrodes are likely $Fe_3O_4$ (FIGS. A-L). This agrees with the XRD results (FIG. 7). FIGS. 11A-11L illustrate example TEM micrographs of cycled anodes in a discharged state after cycling of $FeO_x$/AC nanocomposites produced in accordance with the process of FIG. 1B, including: $FeO_x$/AC at a cut-off voltage of 1.0 V (FIGS. 11A and 11D); $FeO_x$/AC at a cut-off voltage of 1.3 V (FIGS. 11B and 11E); $FeO_x$/AC+$Na_2S$ at cut-off voltage of 1.0 V (FIGS. 11C and 11F); and $FeO_x$/AC+In(acac)$_3$ at cut-off voltage of 1.0 V (FIGS. 11G-11L). Many $Fe_3O_4$ particles formed in the cells cycled with 1.0 V as a cut-off voltage (FIGS. 11A and 11D) are porous. In contrast, $Fe_3O_4$ particles found in the cells cycled with a 1.3 V cut-off voltage were crystalline and dense (non-porous) (FIGS. 11B and 11E). When comparing the impact of additives, In(acac)$_3$ results in a significantly more porous $Fe_3O_4$ formation after cycling than that of $Na_2S$-comprising electrodes. Higher surface area and more porous $Fe_3O_4$ result in higher electrochemical activity. As such, the observed results are consistent with electrochemical performance (FIG. 4). FIGS. 12A-12D illustrate a simplified schematic of the cycling process of a conventional electrode and an example $FeO_x$/AC nanocomposite-based electrode (e.g., produced in accordance with the process of FIG. 1B). Compared with a conventional Ni/Fe battery using commercial Fe particle mixing with AC as the anode material (FIG. 12A), a battery using an $FeO_x$/AC composite effectively suppresses the Fe dissolution and diffusion (FIGS. 12B-12C), and a battery using an FeOx/AC composite modified with In(acac)$_3$ enhances the Fe dissolution and diffusion (FIG. 12D).

Figure 13:
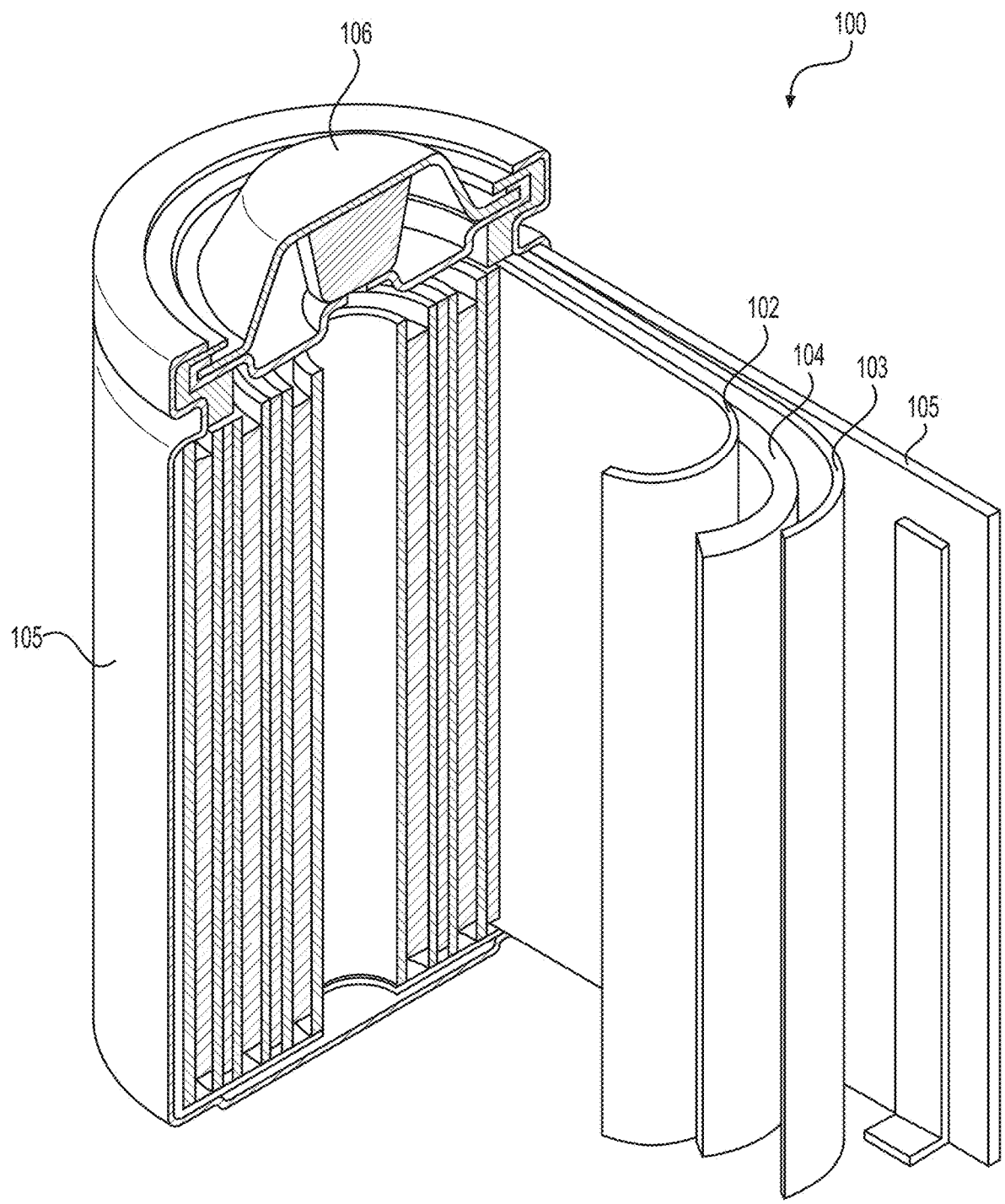
FIG. 13 illustrates an example battery in which the components, materials, methods, and other techniques described herein, or combinations thereof, may be applied according to various embodiments.

FIG. 13 illustrates an example battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown explicitly) impregnating the separator 104, a battery case 105, and a sealing member 106 sealing the battery case 105. In some designs, a cylindrical or prismatic battery may only have one (or only a few) layers of anode 102 and cathode 103.

As demonstrated above, a streamlined method to produce active material-based nanocomposites (e.g., Fe—$FeO_x$/AC nanostructured composite powder) is disclosed herein where the active material (e.g., Fe—$FeO_x$) is distributed (e.g., uniformly distributed) inside of nanopores (e.g., carbon nanopores) and little or no active material (e.g. $FeO_x$) is present on the outer particle surface. In some designs, similar structures may also be produced by using alternative fabrication routes (for example, by forming precursor compositions followed by heat-treatment in a controlled gaseous environment or vacuum). In an example, the Ni/Fe battery based on $FeO_x$/AC nanocomposites demonstrates a remarkably high first cycle discharge capacity of up to 600 mAh g$^{-1}$. While some electrochemical cycling induced dissolution and re-precipitation of the Fe/$FeO_x$ outside the particle surface may occur, nanoconfinement (i.e., confinement to nanopores) may reduce the degree of Fe dissolution, at least sufficiently for some applications. Increasing the discharge cut-off voltage from 1 to 1.3 V suppresses the Fe dissolution and improves discharge capacity retention to 85% capacity after 200 cycles, at the expense of reduced capacity utilization. Two additives $Na_2S$ and In(acac)$_3$ affect cell performance noticeably. $Na_2S$ reduces electrochemical polarization and dissolution, but may also reduce accessible capacity. In(acac)$_3$, in contrast, increases accessible capacity and changes the discharge profile—a single high voltage discharge plateau is obtained instead of two, which increases accessible energy density from Fe-based anodes and is advantageous for various applications because a near-constant voltage is maintained over the whole discharge. At the same time, In(acac)$_3$ cells show relatively fast degradation due to the dissolution and homogenous re-precipitation of Fe/$FeO_x$ into large agglomerates.

The use of ionically conductive pore sealing materials or ionically conductive pore fillers that occupy a majority of the pore volume in $FeO_x$/AC nanocomposites may substantially or nearly completely prevent dissolution of active material, thus enabling very long cycle stability.

The use of the disclosed nanostructures in other applications (e.g., gas storage, electrochemical sensors, supercapacitors, Li-ion batteries, Na-ion batteries, other batteries, hybrid energy storage devices, catalysts, etc.) may similarly be beneficial.

WORKING EXAMPLES

As an example synthesis process, an $FeO_x$/AC nanocomposite may be synthesized by a vacuum impregnation technique as illustrated graphically in FIG. 1B. A working example of the process of FIG. 1B will now be described in more detail. For example, 300 mg Iron pentacarbonyl (Fe(CO)$_5$) precursor solution may be added dropwise to 100 mg spherical nanoporous activated carbon (AC), with vacuum being applied during the interval of every second addition to ensure effective impregnation of the precursor in the carbon matrix. The precursor-loaded composite may then be pre-heated in Ar at 60° C. for 30 mins aiming to evaporate the Fe(CO)$_5$ precursor solution on the surface of AC, then heated up to 140° C. for another 1 h aiming to decompose the liquid Fe(CO)$_5$ to particle (not Fe, maybe Fe(CO)$_x$ (x<5)). The above process may be repeated multiple (e.g., four) times to increase the mass loading of $FeO_x$ up to 60% in AC. The samples may be exposed to the air to pre-oxidize the Fe(CO)$_x$ to amorphous $FeO_x$, and the samples annealed at 300° C. to obtain crystal $FeO_x$/AC.

In a further working example of another embodiment of the present invention, an anode electrode paste film may be prepared by mixing, for example, 70 wt. % of $FeO_x$/AC nanocomposites, 10 wt. % of polytetrafluoroethylene (PTFE) binder, 10 wt. % of $Bi_2O_3$ performance enhancing additive, and 5 wt. % FeS performance enhancing additive in an $H_2O$ solution of 1 wt. % single wall carbon nanotubes (SWCNTs) as conductive additives and 4 wt. % Polyvinylpyrrolidone (PVP) dispersing agent to form an aqueous (water-based) slurry. Other wt. fractions of the materials and other types of binders, performance enhancing additives, conductive additives and dispersing agents may also be successfully utilized. The slurry may be stirred uniformly and then heated in an oven to evaporate substantially all of the $H_2O$ (in case of aqueous slurry preparation). Some ethanol (or other suitable solvent) may be added into the above material and pressed to form a plasticine-like material. The produced composite may be rolled (e.g., to an approximately 0.25 mm film) and dried at 80° C. under vacuum overnight to produce an electrode film. Thinner electrodes may result in higher power performance. Thicker electrodes may reduce fabrication cost and the volume fraction of inactive materials (such as current collectors, separators, etc.). For most applications, the suitable electrode thickness may range from around 30 micron to around 3 mm. The electrode film may be cut into suitably-sized (for a given cell form factor) pieces (e.g., in our experiment into round pieces with a diameter of approximately ½", and a mass loading of $FeO_x$ that is approximately 5 mg cm$^{-2}$) and pressed on to Ti mesh or other suitable current collector. In other designs, the electrode slurry may be directly coated onto a current collector, dried and (in some designs) densified/calendared.

In another embodiment of the present invention, anodes with $Na_2S$ or In acetylacetonate as additives may be made by dropping their ethanol solution on the $FeO_x$/AC electrode film and then vacuum it aiming to impregnate the salts into the pores of the $FeO_x$/AC coating the particles of $FeO_x$.

In further working example of another embodiment of the present invention, a suitable cathode electrode may be prepared, for example, by mixing 80 wt. % $Ni(OH)_2$, 10 wt. % purified exfoliated graphite, PEG, 10 wt. % PTFE in ethanol to make a slurry. Other processes may be similar to those described above with respect to making the anode except using a different current collector (e.g., a Ni foam as current collector). Sandwich-type electrochemical cells may be set up, for example, with the anode and cathode separated by 2 layers of a porous polypropylene membrane, and 7 M KOH+1 M LiOH aqueous solutions may be used as electrolytes.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. An active material-based nanocomposite particle for use in an electrolyte-containing electrochemical energy storage device, comprising:
  a nanoporous carbon, metal, or metal oxide material;
  active material particles infiltrated in pores of the nanoporous carbon, metal or metal oxide material; and
  a filler material that is infiltrated in the pores separately from the active material particles and/or a sealing material that at least partially closes the pores,
  wherein the active material particles comprise Fe,
  wherein the active material particles comprise from about 30 vol. % to about 99 vol. % of a total volume of the active material-based nanocomposite particle,
  wherein the active material-based nanocomposite particle is arranged as a powder, and
  wherein the filler material and/or the sealing material comprise an ionically conducting material with a conductivity of active ions in a range from about $10^{-7}$ S cm$^{-1}$ to about $10^{-3}$ S cm$^{-1}$ at operating temperature and/or in a range from about $10^{-9}$ S cm$^{-1}$ to about $10^{-1}$ S cm$^{-1}$ at room temperature.

2. The active material-based nanocomposite particle of claim 1, wherein the active material-based nanocomposite particle comprises an oxide, hydroxide, oxy-hydroxide, sulfide, fluoride, an oxy-fluoride or hydride of Fe, Zn, Ni, Mn, Ag, Al, Cu, Si, Ti, Nb, Ta, Li, Na, Mg or a mixture thereof.

3. The active material-based nanocomposite particle of claim 1, wherein the active material-based nanocomposite particle includes the filler material.

4. The active material-based nanocomposite particle of claim 3, wherein the filler material includes one or more one or more of In, S, Na, Cd, Pb, Nb, Ti, Si, Ta, Mo, W, Zn, Sn, Bi, H, C, N, O, F, Cl, P, one or more polymers, one or more cross-linked ionic liquids, one or more organic salts, or any combination thereof.

5. The active material-based nanocomposite particle of claim 4, wherein the filler material includes an ionically conducting polymer with a conductivity of active ions in a range from about $10^{-7}$ S cm$^{-1}$ to about $10^{-3}$ S cm$^{-1}$ at room temperature.

6. The active material-based nanocomposite particle of claim 4, wherein the filler material includes $In(acac)_3$ or $Na_2S$.

7. The active material-based nanocomposite particle of claim 3,
  wherein the filler material is substantially insoluble in an electrolyte, or
  wherein the filler material is substantially impermeable to an electrolyte solvent, or
  wherein the filler material is substantially permeable to ions being transported into or out of the pores during device operation, or
  wherein the filler material is insulative and is substantially resistant to electron transport, or
  wherein the filler material swells less than about 10% in response to exposure to the electrolyte, or
  any combination thereof.

8. The active material-based nanocomposite particle of claim 1, wherein the active material-based nanocomposite particle includes the sealing material.

9. The active material-based nanocomposite particle of claim 8, wherein the sealing material includes one or more of a polymer, a gel, a ceramic, carbon, or any combination thereof.

10. The active material-based nanocomposite particle of claim 9, wherein the sealing material includes an ionically conducting polymer with a conductivity of active ions in a range from about $10^{-7}$ S cm$^{-1}$ to about $10^{-3}$ S cm$^{-1}$ at room temperature.

11. The active material-based nanocomposite particle of claim 8,
  wherein the sealing material is substantially insoluble in an electrolyte, or
  wherein the sealing material is substantially impermeable to an electrolyte solvent, or
  wherein the sealing material is substantially permeable to active ions being transported into or out of the pores, or
  wherein the sealing material is insulative and is substantially resistant to electron transport, or
  wherein the sealing material swells less than about 10% in response to exposure to the electrolyte, or
  any combination thereof.

12. The active material-based nanocomposite particle of claim 1, wherein the active material-based nanocomposite particle is configured for use in an anode.

13. A method of synthesizing an active material-based nanocomposite particle for an electrolyte-containing electrochemical energy storage device, comprising:
  infiltrating a first active material precursor into pores of a nanoporous carbon, metal or metal oxide material to produce the active material-based nanocomposite particle;

annealing the active material-based nanocomposite particle at a first temperature to at least partially remove excess material of the first active material precursor from an external surface of the active material-based nanocomposite particle;

annealing the active material-based nanocomposite at a second temperature to at least partially decompose the first active material precursor into a first gaseous material and an active material and/or a second active material precursor infiltrated inside the pores;

exposing the active material-based nanocomposite particle to a second gaseous material or a liquid material to at least partially convert the active material and/or the second active material precursor into active material particles that are infiltrated inside the pores and/or to infiltrate a secondary material into the pores;

annealing the active material-based nanocomposite particle at a third temperature to remove volatile residues, to enhance electrical contact within the active material-based nanocomposite particle and/or to enhance one or more structural properties of the active material-based nanocomposite particle; and infiltrating a filler material into the pores before the infiltration of the first active material precursor and/or at least partially closing the pores with a sealing material after the annealing at the third temperature, wherein the active material particles comprise Fe, wherein the active material particles comprise from about 30 vol. % to about 99 vol. % of a total volume of the active material-based nanocomposite particle, wherein the active material-based nanocomposite particle is arranged as a powder while the filler material and/or the sealing material is part of the active material-based nanocomposite particle, and wherein the filler material and/or the sealing material comprise an ionically conducting material with a conductivity of active ions in a range from about $10^{-7}$ S $cm^{-1}$ to about $10^{-3}$ S $cm^{-1}$ at operating temperature and/or in a range from about $10^{-9}$ S $cm^{-1}$ to about $10^{-1}$ S $cm^{-1}$ at room temperature.

14. The method of claim 13, wherein the infiltrating of the first active material precursor is implemented via a gas-phase impregnation technique.

15. The method of claim 13, wherein the active material includes Fe, Zn, Ni, Mn, Ag, Al, Cu, Si, Ti, Nb, Ta, Li, Na, Mg, Sn, Sb or a mixture thereof.

16. The method of claim 15,
wherein the first active material precursor comprises $Fe(CO)_5$,
wherein the second active material precursor comprises iron oxide,
wherein the active material includes Fe, and
wherein the active material particles include at least 1 wt. % of $FeO_x$, where $1<x<1.8$.

17. The method of claim 13, wherein the active material includes an oxide, hydroxide, oxy-hydroxide, halide, oxyhalide or hydride of Fe, Zn, Ni, Mn, Ag, Al, Cu, Si, Ti, Nb, Ta, Li, Na, Mg or a mixture thereof.

18. The method of claim 13, wherein the active material includes a mixture or alloy of two or more distinct materials from the classes of metals, semi-metals, metal oxides, metal oxy-hydroxides, metal sulfides, metal sulfates, metal phosphates, metal phosphides, metal nitrides, metal nitrates, metal selenides, metal fluorides, metal oxyfluorides, metal hydrides, and/or other metal salts in any combination.

19. The method of claim 13, wherein the second gaseous material is selected from a group that includes air, nitrogen, argon, at least one hydrogen or hydrogen-containing gas, at least one sulfur-containing gas, at least one fluorine-containing gas or a combination thereof.

20. The method of claim 13,
wherein the third temperature is higher than the second temperature, and
wherein the second temperature is higher than the first temperature.

21. The method of claim 20,
wherein the first temperature is about or above 60° C.,
wherein the second temperature is about or above 140° C., and
wherein the third temperature is about or above 300° C.

22. The method of claim 13, further comprising:
infiltrating the filler material into the pores of the active material-based nanocomposite particle.

23. The method of claim 22, wherein the filler material includes one or more of In, S, Na, Cd, Pb, Nb, Ti, Ta, Mo, W, Zn, Sn, Si, Bi, H, C, N, P, O, Cl, or F, one or more polymers, one or more cross-linked ionic liquids, one or more organic salts, or any combination thereof.

24. The method of claim 23, wherein the filler material includes an $OH^-$ conducting polymer.

25. The method of claim 23, wherein the filler material includes $In(acac)_3$ or $Na_2S$.

26. The method of claim 22,
wherein the filler material is substantially insoluble in an electrolyte, or
wherein the filler material is substantially impermeable to an electrolyte solvent, or
wherein the filler material is substantially permeable to active ions being transported into or out of the pores, or
wherein the filler material is insulative and is substantially resistant to electron transport, or
wherein the filler material swells less than about 10% in response to exposure to the electrolyte, or
any combination thereof.

27. The method of claim 13, further comprising:
sealing one or more of the pores with a protective surface layer formed from the sealing material.

28. The method of claim 27, wherein the sealing material includes one or more of a polymer, a gel, a ceramic, carbon, or any combination thereof.

29. The method of claim 28, wherein the sealing material includes an ionically conducting polymer with the conductivity of active ions in the range from about $10^{-7}$ S $cm^{-1}$ to about $10^{-3}$ S $cm^{-1}$ at room temperature.

30. The method of claim 27,
wherein the sealing material is substantially insoluble in an electrolyte, or
wherein the sealing material is substantially impermeable to an electrolyte solvent, or
wherein the sealing material is substantially permeable to active ions being transported into or out of the pores, or
wherein the sealing material is insulative and is substantially resistant to electron transport, or
wherein the sealing material swells less than about 10% in response to exposure to the electrolyte, or
any combination thereof.

31. An active material-based nanocomposite particle for use in an electrolyte-containing electrochemical energy storage device, comprising:
a nanoporous carbon, metal, or metal oxide material;
active material particles infiltrated in pores of the nanoporous carbon, metal or metal oxide material; and a filler material infiltrated in the pores separately from the active material particles and/or a sealing material that at least partially closes the pores, wherein the active material particles comprise Fe, wherein the active material particles comprise from about 30 vol. % to about 99 vol. % of a total volume of the active material-based nanocomposite particle, wherein the active material-based nanocomposite particle is arranged as a powder, and wherein the filler material and/or the sealing material comprise an ionically conducting material with a conductivity of active ions in a range from about $10^{-7}$ S cm$^{-1}$ to about $10^{-3}$ S cm$^{-1}$ at room temperature.

* * * * *